US008325632B2

(12) United States Patent
Gorbachov

(10) Patent No.: US 8,325,632 B2
(45) **Date of Patent: *Dec. 4, 2012**

(54) MULTI-CHANNEL RADIO FREQUENCY FRONT END CIRCUIT WITH FULL RECEIVE DIVERSITY FOR MULTI-PATH MITIGATION

(75) Inventor: Oleksandr Gorbachov, Irvine, CA (US)

(73) Assignee: RFaxis, Inc., Irvine, CA (US)

(*) Notice: Subject to any disclaimer, the term of this patent is extended or adjusted under 35 U.S.C. 154(b) by 466 days.

This patent is subject to a terminal disclaimer.

(21) Appl. No.: 12/498,905

(22) Filed: Jul. 7, 2009

(65) Prior Publication Data

US 2010/0226292 A1 Sep. 9, 2010

Related U.S. Application Data

(63) Continuation of application No. 12/470,960, filed on May 22, 2009.

(60) Provisional application No. 61/156,954, filed on Mar. 3, 2009.

(51) Int. Cl.

| | |
|---|---|
| ***H04J 3/00*** | (2006.01) |
| ***H04B 1/38*** | (2006.01) |
| ***H04B 1/44*** | (2006.01) |
| ***H01Q 21/00*** | (2006.01) |

(52) U.S. Cl. ............ 370/280; 455/73; 455/83; 343/835; 343/853

(58) Field of Classification Search .................. 370/280, 370/203, 208; 455/83, 84, 73, 78, 552.1, 455/553.1; 343/835, 820, 853, 861; 333/101
See application file for complete search history.

(56) References Cited

U.S. PATENT DOCUMENTS 5,349,313 A 9/1994 Collins et al.
(Continued)

FOREIGN PATENT DOCUMENTS

WO 2008/002697 3/2008

OTHER PUBLICATIONS

International Search Report; PCT/US2010/033593; Jul. 7, 2010; 17 pages.

(Continued)

*Primary Examiner* — Kwang B Yao
*Assistant Examiner* — Candal Elpenord
(74) *Attorney, Agent, or Firm* — Stetina Brunda Garred & Brucker

(57) ABSTRACT

A front end circuit for coupling a plurality of antennas to a multi-channel time domain duplex RF transceiver is disclosed. The front end circuit has a first transmit port, a first receive chain primary port, a first receive chain secondary ports, and a first antenna port connectible to a first one of the plurality of antennas. The front end circuit also has a second transmit port, a second receive chain primary port, and a second receive chain secondary port connectible to a second one of the plurality of antennas. A first switch has terminals connected to the first transmit port, the first receive chain primary port, and the second receive chain secondary port, as well as a common terminal that is connected to the first antenna port. Additionally, the front end circuit has a second switch that has terminals connected to the second transmit port, the second receive chain primary port and the first receive chain secondary port, and a common terminal connected to the second antenna port.

8 Claims, 15 Drawing Sheets

ON-BOARD UNIT
TRANSCEIVER
FIRST CHANNEL MODULE 30a
SECOND CHANNEL MODULE 30b
MICRO-PROCESSOR 32
FRONT END CIRCUIT 33
26
36a
36b
26
ROAD SIDE UNIT
FRONT END CIRCUIT 33
TRANSCEIVER
FIRST CHANNEL MODULE 30a
SECOND CHANNEL MODULE 30b
MICRO-PROCESSOR 32
36a
36b
28 22
21
24 28

U.S. PATENT DOCUMENTS 5,962,880 A 10/1999 Oda et al.
6,043,714 A 3/2000 Yamamoto et al.
6,108,313 A 8/2000 Lee et al.
6,154,664 A 11/2000 Chorey et al.
6,308,047 B1 10/2001 Yamamoto et al.
6,313,699 B1 11/2001 Nishijima et al.
6,469,587 B2 10/2002 Scoggins
6,498,535 B1 12/2002 Allen et al.
6,529,080 B1 3/2003 Seymour et al.
6,556,075 B1 4/2003 Jordan
6,690,238 B2 2/2004 Lautzenhiser et al.
6,728,517 B2 * 4/2004 Sugar et al. .................... 455/73
6,735,418 B1 5/2004 MacNally et al.
6,771,475 B2 8/2004 Leete
6,977,552 B2 12/2005 Macedo
6,998,709 B2 2/2006 Khorram
7,005,942 B2 2/2006 Culliton et al.
7,120,427 B1 10/2006 Adams et al.
7,155,252 B2 * 12/2006 Martin et al. .............. 455/553.1
7,194,284 B2 * 3/2007 Rousu ........................ 455/553.1
7,256,665 B2 8/2007 Harris
7,315,730 B2 1/2008 Galan
7,373,171 B2 5/2008 Nakai
7,738,840 B2 * 6/2010 Rofougaran .................... 455/78
8,005,504 B2 * 8/2011 Sano et al. ................. 455/552.1
8,085,734 B2 * 12/2011 Faber ............................ 370/334
2003/0228848 A1 12/2003 Escoffier et al.
2004/0203707 A1 * 10/2004 Akhteruzzaman et al. .......................... 455/422.1
2004/0209584 A1 10/2004 Bargroff et al.
2004/0251960 A1 12/2004 Macedo
2005/0009484 A1 1/2005 Imai et al.
2005/0186986 A1 * 8/2005 Hansen et al. ............. 455/553.1
2005/0206456 A1 9/2005 Suzuki et al.
2006/0035601 A1 2/2006 Seo
2006/0068837 A1 3/2006 Malone
2006/0079275 A1 * 4/2006 Ella et al. .................. 455/553.1
2006/0270367 A1 11/2006 Burgener et al.
2006/0290421 A1 12/2006 Ichitsubo et al.
2007/0015472 A1 1/2007 Murtojarvi et al.
2007/0049213 A1 * 3/2007 Tran ............................... 455/78
2007/0161358 A1 7/2007 Bogdan
2007/0194859 A1 8/2007 Brobston et al.
2007/0222697 A1 9/2007 Caimi et al.
2007/0232241 A1 10/2007 Carley et al.
2008/0089252 A1 4/2008 Choi
2008/0106476 A1 * 5/2008 Tran et al. ..................... 343/702
2008/0159458 A1 7/2008 Cheng et al.
2008/0182526 A1 7/2008 Moloudi et al.
2008/0220826 A1 9/2008 Dagher et al.
2008/0279262 A1 11/2008 Shanjani
2009/0036065 A1 2/2009 Siu
2009/0167627 A1 * 7/2009 Breiter .......................... 343/852
2009/0239471 A1 * 9/2009 Tran et al. .................... 455/41.2

OTHER PUBLICATIONS

WLAN WiMAX PA & FEM Market, Feb. 12, 2009; 158 page presentation.
Cirronet ZigBee High Power Module ZMN2405HP; Oct. 28, 2007; 6 pages.
Cirronet ZigBee High Power Module ZMN2430HP; Oct. 28, 2007; 6 pages.
Cirronet ZigBee Matching RF power performance to ZigBee apps—Electronic Products; 4 pages; http://www2.electronicproducts.com/PrintArticle.aspx?ArticleURL=cirronet.feb2006.html.
Design of a Dual Band Wireless LAN SiGe-Bipolar Power Amplifier; from Sep. 2004 High Frequency Electronics; 8 pages.
EPOCS WLAN Modules Preliminary Datasheet R041_M01; Jun. 20, 2006; 14 pages.
Ember Datasheet; EM2420 2.4 GHz IEEE 802.15.4 / ZigBee RF Transceiver; Copyright 2003, 2004 by Ember Corporation; 89 pages.
Free2Move Class 1 Bluetooth Module—F2M03C1 Datasheet; Rev. 13 Sep. 2005; 46 pages.
Freescale Semiconductor Technical Data Document No. MC13191/D; Rev. 1.2 Apr. 2005; MC13191: 2.4 GHz ISM Band Low Power Transceiver; 24 pages.
Freescale Semiconductor Technical Data Document No. MC13192; Rev. 3.2 May 2007; MC13192: 2.4 GHz Low Power Transceiver for the IEEE 802.15.4 Standard; 24 pages.
Freescale Semiconductor; MC13191: 2.4 GHz Low Power Transceiver for the IEEE 802.15.4 Standard; Reference Manual; Document No. MC13191RM; Rev. 1.2; Apr. 2005; 92 pages.
Freescale Semiconductor Technical Data; Document No. MC13192; Rev. 2.8, Apr. 2005; MC13192/MC13193: 2.4 GHz Low Power Transceiver for the IEEE 802.15.4 Standard; 23 pages.
Freescale Semiconductor MC13192/MC13193: 2.4 GHz Low Power Transceiver for the IEEE 802.15.4 Standard; Reference Manual; Rev. 1.3 Apr. 2005; 111 pages.
California Eastern Laboratories: FreeStar ZFSM-100 Series ZigBee-Ready Modules; May 2008; 1 page.
California Eastern Laboratories; Apex ZAXM-201 Series ZigBee Pro-Ready Modules; CL596C.5.08; 1 page.
California Eastern Laboratories; Apex LT ZALM-301 Series ZigBee Pro-Ready Modules; CL596.LT.5.08; 1 page.
California Eastern Laboratories; ZIC2410 Datasheet; Rev. A; Document No. 0005-05-07-00-000; 119 pages.
CEL Preliminary Data Sheet; Apex & Apex LT Series Transceiver Modules; ZAXM-201-1, ZALM-301-1; May 7, 2008; 17 pages.
CEL Preliminary Data Sheet; Freestar Series Transceiver Module; ZFSM-101-1; May 7, 2008; 10 pages.
CEL Preliminary Data Sheet; Matrix Transceiver Modules; ZMXM-400 Series; May 7, 2008; 12.
J. Trachewsky, et al.; Broadcom WLAN Chipset for 802.11a/b/g; Broadcom Corporation, CA, USA; Aug. 17, 2003; 42 pages.
Anadigics; AWL6254; 1.4 GHz 802.11b/g/n; WLAN PA, LNA, and RF Switch Data Sheet—Rev 2.0; Feb. 2008; 16 pages.
Anadigics; AWM6430; 3.3-3.6 GHz Power Amplifier Module; Preliminary Data Sheet; Rev 1.0; Jan. 2006; 12 pages.
Hickman, Robert; Anadigics; A New Technology For WLAN Power Amplifiers; Warren NJ; 28 pages.
Zhang, Weimin; A Low Voltage Fully-Integrated 0.18um CMOS Power Amplifier for 5GHz WLAN; Institute of Microelectronics, Singapore; 2002; 4 pages.
Copeland, Miles A.; 5-GHz SiGe HBT Monolithic Radio Transceiver with Tunable Filtering; IEEE Transactions on Microwave Theory and Techniques, vol. 48 No. 2, Feb. 1000, 12 pages.
Atheros AR3011—ROCm Solutions for Bluetooth; Radio-On-Chip for Mobile (ROCm) Products; Jan. 22, 2008; 2 pages.
Atheros AR3000—ROCm Solutions for Bluetooth Radio-On-Chip for Mobile (ROCm) Products; Jan. 22, 2008; AR3031; 2 pages.
Atheros ROCm Platform; Radio-On-Chip for Mobile (ROCm; AR6001GL; Embedded 802.11b/g Solution for Mobile and Battery-Operated Devices; 2006; 2 pages.
AR6002 Breaking the Power Barrier in Mobile WiFi; Aug. 28, 2008; 2 pages.
AR6001GL; Embedded 802.11b/g Solution for Mobile and Battery-Operated Devices; 2006; 2 pages.
AR6001XL; Embedded 802.11a/b/g Solution for Mobile and Battery-Operated Devices; 2006; 2 pages.
AR6101G; World's Most Integrated, Cost-Effective Single-Chip WLAN Handset Design Brings Voice-Over-WiFi to the Mainstream; 2006; 2 pages.
AR9285 Single-chip PCIe based on 802.11n 1-stream specification; Oct. 28, 2008; 2 pages.
AR9002AP-1S; AP/Router solution based on 802.11n 1-stream specification; Oct. 28, 2008; 2 pages.
Fully-Integrated RF Transceiver System-on-Chip For ZigBee/IEEE 802.15.4 Applications Announced; California Eastern Laboratories, 2 pages.
Bluetooth RF Module RB06 Series for QUALCOMM Based Handsets, Kyocera, 4 pages.
How MLO Works the Power of Passive Components; JMD RF Made Simple: Jacket Micro Devices: Modules; copyright 2006 Jacket Micro Devices, Inc., 2 pages.
International Search Report; PCT/US2009/051906; Oct. 15, 2009, 14 pages.
International Search Report; PCT/US2009/044524, Jul. 14, 2009, 10 pages.
International Search Report PCT/US2009/038621; Jul. 20, 2009.

International Search Report PCT/US2009/041834; Jun. 17, 2009.
Atmel: Bluetooth Front-end IC 17024 Design Guide; Jun. 2004; 18 pages.
Atmel: Integrated SiGe Front-end RF ICs;2003, 2 pages.
Atmel: 5-GHz WLAN Power Amplifier for 802.11a, ATR3515 Preliminary; 2004, 7 pages.
Atmel: High Gain Power Amplifier for 802.11b/g WLAN Systems, ATR7032 Preliminary; 2006, 15 pages.
Atmel: ZigBee IEEE 802.15.4 Radio Transceiver; AT86RF230, Preliminary; 2007, 82 pages.
Anadigics: AWM6430; 3.5 GHz WiMAX Power Amplifier Module, Advanced Product Information—Rev. 0.1; Jan. 2005; 12 pages.
Broadcom; BCM4328 Product Brief; Air Force One Single-Chip IEEE 802.11a/b/g MAC/Baseband/Radio With Integrated CPU; Dec. 5, 2006; 2 pages.
Broadcom; BCM4326 Product Brief; Air Force One Single-Chip IEEE 802.11b/g MAC/Baseband/Radio With Integrated CPU; Dec. 5, 2006; 2 pages.
Broadcom: BCM94318 Product Brief: Airforce One Chip 802.11 Reference Design; Oct. 7, 2004; 2 pages.
Xin He, Fully Integrated Transceiver Design in SOI Processes, a Dissertation, Kansas State University, 2004, 129 pages.
Schlegel, Gunther, Sr.; Improving Sensitivity of RF-Based AMI Front-End Systems; 16 pages.
Maxim: Industry's First Ultra-Low-Power, 802.11g/b RF Transceiver to Integrate PA, Rx/Tx/Antenna Diversity Switches, and Crystal Oscillator Circuitry; Apr. 30, 2008; 2 pages.
Maxim: MAX2830 Industry's First802.11G/B RF Transceiver with Integrated PA, Rx/Tx and Antenna Switches; Apr. 30, 2008; 3 pages.
Meshnetics: ZigBit Amp OEM Modules; ZDM-A1281-PN/PNO (MNZG-A24-UFL/UO) Revision 2.2; Ultra-Compact 2.4GHz 802.15.4/ZigBee Modules with Power Amplifier for Wireless Networking Applications; Oct. 2008, 18 pages.
Meshnetics M2M-100-2008: ZigBit AMP Module; 2.4 GHz Amplified Modules for IEEE 802.15.4/ZigBee Wirelessss Mesh Networking Applications; 2 pages.
Meshnetics: ZigBit Amp OEM Modules ZDM-A1281-PN/PNO Revision 2.1; Ultra-Compact 2.4GHz 802.15.4/ZigBee Modules with Power Amplifier for Wireless Networking Applications; Dec. 2007, 15 pages.
Murata MF2400PJ-SF0702; PA MMIC for 2.4GHz Wireless Communication; Jan. 18, 2003; 11 pages.
CEL California Eastern Laboratories: Class 1 Power Amplifiers for Bluetooth; 1 page.
CEL; GaAs Integrated Circuit PG2250T5N; 1.8 V, Power Amplifier for Bluetooth Class 1; NEC Electronics Corp.; 2006, 12 pages.
CEL NEC's Power Amplifier for Bluetooth Class 1: UPG2301TQ Data Sheet; Feb. 4, 2004; 7 pages.
CEL: GaAs HBT Integrated Circuit PG2314T5N: Power Amplifier for Bluetooth Class 1; Jul. 2006, 10 pages.
CEL Application Note: AN1048 UPG2150T5L Switch; Sep. 29, 2005, 1 page.
CEL California Eastern Laboratories: AN1049 UPG2314T5N HBT PA IC for Bluetooth and ZigBee; Oct. 17, 2005; 5 pages.
RT2501 Wireless Chipset 802.11 b/g solution featuring Packet-Overdirve Technology; Ralink Technology Corp; 2006, 1 page.
RT2501U; USB2.0 Wireless Chipset 802.11 b/g solution featuring Packet-Overdirve Technology; Ralink Technology Corp., 2006, 1 page.
RT2600 MIMO XR Wirless Chipset 802.11b/g solution featuring Packet-Overdrive and Range-Overdirve Technologies; Ralink Technology Corp; 2006, 1 page.
RT2700 MIMO Wireless Chipset Family; 802.11n Solution featuring MIMObility Technology; Ralink Technology Corp; 2006, 2 pages.
RT2800 MIMO Wireless Chipset Family 802.11n Solution featuring MIMObility Technology; Ralink Technology Corp; 2006, 2 pages.
RT5201 Wireless Chipset 802.11 a/b/g solution featuring Packet-Overdirve Technology; Ralink Technology Corp; 2006, 1 page.
RT5201U USB 2.0 Wireless Chipset 802.11 a/b/g solution featuring Packet-Overdirve Technology; Ralink Technology Corp; 2006, 1 page.
RT5600 MIMO XR Wireless Chipset 802.11 a/b/g solution featuring Packet-Overdirve and Range-Overdirve Technologies; Ralink Technology Corp; 2006, 1 page.
Agnelli, Federico, et al; Wireless Multi-Standard Terminals: System Analysis and Design of a Reconfigurable RF Front-end; IEEE Circuits and Systems Magazine; First Quarter 2006; p. 38-59.
Cutler, Tim; ZigBee: RF power options in ZigBee solutions; Emerging Wireless Technology/A Supplement to RF Design; www.rfdesign.com; Mar. 2006; p. 18-21.
RFMD Preliminary: RF5263: 3.3V to 5.0V, 2.5GHz Linear Power Amplifier; pp. 7-31 to 7-32.
RFMD: RF5300: 3V, 5GHz Linear Power Amplifier pp. 2-655 to 2-660.
RFMD: RF5163: 3V-5V, 2.5 GHZ Linear Power Amplifier; pp. 2-627 to 2-638.
RFMD SiW1722B: Bluetooth Transceiver Solution for CDMA and WCDMA Mobile Phones; rfmd.com; Oct. 2006; 2 pages.
RFMD RF5924 3.7V, Single-Band Front-End Module pp. 8-1 to 8-2.
RFMD RF5122 3V to 4.5V, 2.4GHz to 2.5GHz Linear Power Amplifier; 12 pages.
Richwave RTC6682 VO.3 Data Sheet Aug. 2006; www.richwave.com.tw; 7 pages.
SiGe PA Enables Smallest System Footprint For Embedded WLAN; Semiconductor Online; Dec. 15, 2008; 3 pages.
WLAN & WiMAX from Sirenza: Sirenza Microdevices SZA Series Linear PAs for WiFi / WiBRO / WiMAX; 14 pages.
Skyworks: SKY65336: 2.4 GHz Transmit/Receive Front-End Module with Integrated LNA; Skyworks Solutions, Inc.; Aug. 20, 2008; 2 pages.
Skyworks; SKY65337: 2.4 GHz Transmit/Receive Front-End Module; Skyworks Solutions, Inc.; Aug. 20, 2008; 2 pages.
Skyworks; SKY65241-12: WLAN 802.11a, b, g, n Dual-Band Inters Front-End Module Single Antenna; Skyworks Solutions, Inc.; Mar. 12, 2008; 9 pages.
Skyworks; SKY65243-11: WLAN 802.11a, b, g, n Dual-Band Intera Front-End Module Dual Antennas; Skyworks Solutions, Inc.; Mar. 12, 2008; 8 pages.
Skyworks; SKY65256-11: WLAN 802.11a, b, g, n Dual-Band Front-End Module Single Antenna; Skyworks Solutions, Inc.; Sep. 28, 2007; 10 pages.
Skyworks; SKY65228-11: WLAN 802.11n Single Band 4.9-5.85 GHz MIMO Inters Front-End Module; Skyworks Solutions, Inc.; Oct. 9, 2007; 9 pages.
Skyworks; SKY65206-13: WLAN 802.11b/g Intera Front-End Module; Skyworks Solutions, Inc.; Aug. 21, 2007; 7 pages.
Skyworks; SKY65249-11: WLAN 802.11b, g, n Intera Front-End Module; Skyworks Solutions, Inc.; Nov. 30, 2007; 9 pages.
Skyworks; SKY65227-11: WLAN 802.11n Single Band Inters 2.4 GHz MIMO Inters Front-End Module; Skyworks Solutions, Inc.; Oct. 9, 2007; 9 pages.
Skyworks; SKY65230-11: WLAN 802.11 n 2×2 MIMO Intera Front-End Module with 3 Antenna Ports; Skyworks Solutions, Inc.; Oct. 9, 2007; 13 pages.
Skyworks; SKY65225-11: WLAN 802.11n 2×2 MIMO Intera Front-End Module; Skyworks Solutions, Inc.; May 7, 2007; 11 pages.
Skyworks; SKY65135: WLAN Power Amplifier; Skyworks Solutions, Inc.; Mar. 26, 2007; 13 pages.
Skyworks; SKY65209: WLAN 802.11b/g Front-End Module ; Skyworks Solutions, Inc.; Jan. 18, 2006; 8 pages.
4.9-5.8 GHz High-Linearity Power Amplifier SST11LP11; SST Communications Corp; 2005, 14 pages.
4.9-5.8 GHz High-Linearity Power Amplifier SST11LP12; SST Communications Corp; 2005, 14 pages.
2.4 GHz Power Amplifier SST12LP00; SST Communications Corp; 2005, 9 pages.
2.4 GHz High-Linearity Power Amplifier SST12LP10; SST Communications Corp; 2005, 12 pages.
2.4 GHz Power Amplifier SST12LP14; SST Communications Corp; 2005, 12 pages.
2.4 GHz High-Power, High-Gain Amplifier SST12LP15; SST Communications Corp; 2005, 12 pages.
2.4 GHz High-Power, High-Gain Amplifier SST12LP15A; SST Communications Corp; 2005, 12 pages.

STLC2500C: Bluetooth EDR Single Chip Data Brief; STMicroelectronics; Jan. 2006, 4 pages.
STLC4550: Single Chip 802.11b/g WLAN radio Data Brief; STMicroelectronics; Feb. 2006, 5 pages.
ZigBee—compliant wireless control and sensoring network solutions; STMicroelectronics; Jun. 2006; 8 pages.
Amin, Yasar, et al; Integration of Passives for Receiver Front-End for 5GHz Wireless LAN Applications; Royal Institute of Technology, Sweden & U of Engineering & Tech, Taxila, Pakistan; p. 24-29.
Texas Instruments: CC2591; 2.4-GHz RF Front End, data sheet, Jun. 2008, Texas Instruments, Inc. 18 pages.
Texas Instruments: CC2436; High-Power Dual-Band (2.4-GHz and 4.9-GHz to 5.9-GHz) RF Front End, data sheet, May 2007; Texas Instruments, Inc. 15 pages.
Hoppenstein, Russell; High-Performance WiMAX RF Chipset Enable CPE and BTS Applications; Texas Instruments Inc.
Texas Instruments: Technology for Innovators: WiLink 4.0 single-chip mobile WLAN solutons Product Bulletin; 2006 Texas Instruments Inc., 2 pages.
Chipcon Products from Texas Instruments: CC2420; 2.4 GHz IEEE 802.15.4 / ZigBee-ready RF Transceiver; 2008, Texas Instruments Inc., 89 pages.
Chipcon Products from Texas Instruments: CC2430; A True System-on-Chip solution for 2.4 GHz IEEE 802.15.4 / ZigBee; 2007, Texas Instruments Inc., 212 pages.
Texas Instruments: CC2520 Datasheet; 2.4 GHz IEEE 802.15.4/ SIZBEE RF Transceiver; Dec. 2007; Texas Instruments Inc.; 2007; 128 pages.
Zheng, Shaoyong, et al.; Distributed Power Amplifier/Feedback Low Noise Amplifier Switch-Less Front-End; Dept. Electronic Engineering, City University of Hong Kong, Feb. 8, 2006, p. 1659-1662.
Masse, Cecile; Analog/RF Front End; A direct-conversion transmitter for WiMAX and WiBro applications; www.rfdesign.com ; Jan. 2006, 3 pages.
Xbee OEM RF Modules; ZigBee / 802.15.4 OEM RF Modules by MaxStream, Inc. Specifications; MaxStream, Inc., 2005, 2 pages.
Fanucci, L, et al.; A Novel Fully Integrated Antenna Switch for Wireless Systems; Pisa, Italy, 4 pages.
RFMD: Mobile Computing: Front End Module Portfolio; rfmd.com; 2009, 2 pages.
Maxim: Application Note 686; QPSK Modulation Demystified; May 1, 2002, 7 pages.
An Introduction to Orthogonal Frequency Division Multiplex Technology; Keithley, 17 pages.

* cited by examiner

MULTI-CHANNEL RADIO FREQUENCY FRONT END CIRCUIT WITH FULL RECEIVE DIVERSITY FOR MULTI-PATH MITIGATION

CROSS-REFERENCE TO RELATED APPLICATIONS

This application is a continuation of U.S. application Ser. No. 12/470,960 filed May 22, 2009, entitled MULTI-CHANNEL RADIO FREQUENCY FRONT END CIRCUIT which relates to and claims the benefit of U.S. Provisional Application No. 61/156,954, filed Mar. 3, 2009 and entitled DUAL-CHANNEL (DUAL FREQUENCY) HIGH-SENSITIVITY RF FRONT-END ARCHITECTURES FOR WAVE AND OTHER TDD APPLICATIONS, each of which are wholly incorporated by reference herein.

STATEMENT RE: FEDERALLY SPONSORED RESEARCH/DEVELOPMENT

Not Applicable

BACKGROUND

1. Technical Field

The present invention relates generally to radio frequency (RF) signal circuitry, and more particularly, to multi-channel/frequency front-end integrated circuits for time domain duplex communications.

2. Related Art

Due to population growth and increased mobilization, modern metropolitan areas suffer from substantial congestion that result in decreased productivity, wear to transportation infrastructure, increased fuel consumption, increased risk of bodily harm by accidents, and so forth. A number of systems currently in development under the umbrella term of intelligent transportation systems, or ITS, contemplate the application of information technology to solve such transportation-related problems. These applications include onboard navigation systems that have real-time traffic update capabilities and map update capabilities, as well as signal control systems that request data from passing vehicles to determine and regulate traffic flow. Additionally, some applications contemplate one vehicle being able to communicate with another for collision avoidance and the like.

A variety of networking standards for intelligent transportation systems have been proposed that consider the specific needs and environmental limitations. One readily available networking modality is the cellular telephone network such as Global System for Mobile Communications (GSM), Wide-band Code-Division Multiple Access (W-CDMA), and the like. Another networking modality current in development is Wireless Access in Vehicular Environments (WAVE), which is based off the Institute of Electrical and Electronics Engineers (IEEE) 802.11 wireless local area network (WLAN) standards. Specifically, the WAVE standard is referred to as IEEE 802.11p, and a number of car-to-car and car-to-infrastructure applications are being developed with the standard. As WAVE is an 802.11 variant, transceivers therefor are functionally compatible with standard WLAN systems. However, whereas 802.11 b/g WLAN utilizes the 2.4-2.5 GHz Industrial-Scientific-Medical (ISM) band and 802.11 a WLAN utilizes the 4.9-5.85 GHz band, WAVE utilizes the 5.9 GHz band.

Generally, WLAN systems transmit and receive signals on a single channel of frequency. In order to share the single channel, the transmit and the receive signals are time-domain duplexed. That is, for a predetermined period of time, the transmitter generates a burst signal, and for another predetermined period of time, the other transmitter generates another burst signal to be detected by the receiver. It is understood that the transmit signals and the receive signals do not overlap in the time domain. Where the receiver detects errors in the burst signal via checksums and other well-known techniques, the other transmitter may be directed to retry. Errors may be caused in part by increased noise from the surrounding environment, obstacles, and so forth. If there are a substantial number of retry attempts, data throughput is decreased.

One pertinent feature of WAVE is the use of at least two channels at different operating frequencies, one of which is designated a control channel and another that is designated a public safety channel. The control channel is understood to operate at a fixed frequency, and is dedicated for vehicle control data. The public safety channel(s) are understood to be dedicated for safety data to indicate events such as emergency brake activation, left and right turn signal activation, lane changes, etc. Other channels may be utilized for map downloads, traffic updates, Internet connections, and other general-purpose data transfers. WAVE systems encompass vehicle-mounted transceivers, also referred to as on-board units (OBUs), as well as stationary transceivers placed alongside the road, also referred to as road-side units (RSUs).

For the public safety and control channels, it is desirable to have highly sensitive signal detection. Even minor transmission delays that result from the above-mentioned retry attempts may have dire consequences for the lives of vehicle occupants due to the speed at which they are travelling and the criticality of the transmitted information.

Signal reception problems in WAVE systems are commonly attributable to multi-path propagation phenomena, where a single signal reaches the antenna via two or more different paths. At the RF signal level, destructive interference and phase shifts may occur. Multipath propagation may be caused by reflection from mountains, tall buildings, and other such structures. For example, when a car is moving with high speed in crowded environments, the signal between the on-board unit and the road side unit may reflect off nearby buildings, bridges, and other cars. The substantially weakened signal may not be recoverable by the respective receives.

One approach to solve this problem is understood to employ two antennas that are physically separated from each other. The probability that the RF signals reaching both of the antennas with different phases is known to be miniscule, so the dual-antenna configuration is understood to exploit this low probability. In further detail, this approach involves two receive chains, each connected to a separate antenna. This configuration is known as receive antenna diversity. The receiver may select the signal of higher power as the proper signal to be decoded and further processed. Other, more sophisticated techniques such as power combining, maximum likelihood, and so forth for signal extraction are also known in the art. Receive and transmit antenna diversity is particularly useful for deployment on on-board units, as some road side units may be screened by opposite surfaces of the vehicle.

As indicated above, WAVE implementations operate on two distinct channels. Thus, in order to additionally implement antenna diversity, connections to four separate antennas may be necessary. This implementation, however, is expensive and the cables to the antennas may be difficult to manage, in addition to being undesirable as having to mount so many antennas to the external surface of the vehicle.

Accordingly, there is a need in the art for multi-channel or frequency front-end integrated circuits for time domain duplex communications systems such as WAVE.

BRIEF SUMMARY

In accordance with one embodiment of the present invention, a front end circuit for coupling antennas to a multi-channel time domain duplex radio frequency (RF) transceiver is contemplated. The front end circuit may include a first channel module that selectively connects a first transmit line, a first primary receive line, and a first secondary receive line of the transceiver to the antennas. Additionally, the front end circuit may include a second channel module that selectively connects a second transmit line, a second primary receive line, and a second secondary receive line of the transceiver to the antennas. The first channel module and the second channel module may have independently controllable shared switching elements.

According to another embodiment of the present invention, there is provided a front end circuit for coupling a plurality of antennas to a multi-channel time domain duplex RF transceiver. The front end circuit may include a first transmit port, a first receive chain primary port, a first receive chain secondary ports, and a first antenna port connectible to a first one of the plurality of antennas. Further, the front end circuit may include a second transmit port, a second receive chain primary port, and a second receive chain secondary port. The front end circuit may also include a second antenna port connectible to a second one of the plurality of antennas. There may further be a first switch that has terminals connected to the first transmit port, the first receive chain primary port, and the second receive chain secondary port. The first switch may also have a common terminal that is connected to the first antenna port. Additionally, there may be a second switch that has terminals connected to the second transmit port, the second receive chain primary port and the first receive chain secondary port. The first switch may include a common terminal connected to the second antenna port.

In yet another embodiment of the present invention, an RF front end circuit for coupling a pair of antennas to a transceiver with a first operational channel and a second operational channel is contemplated. Each operational channel may have a corresponding transmit line, primary receive line, and secondary receive line. The front end circuit may include a plurality of switching elements that has a first switching mode connecting a first one of the transmit lines to a first one of the antennas. The switching elements may further have a second switching mode connecting a second one of the transmit lines to a second one of the antennas. Additionally, the switching elements may have a third switching mode connecting a first one of the primary receive lines to the first one of the antennas and a first one of the secondary receive lines to the second one of the antennas. The switching elements may have a fourth switching mode connecting a second one of the primary receive lines to the first one of the antennas and a second one of secondary receive lines to the second one of the antennas.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities.

Figure 1:
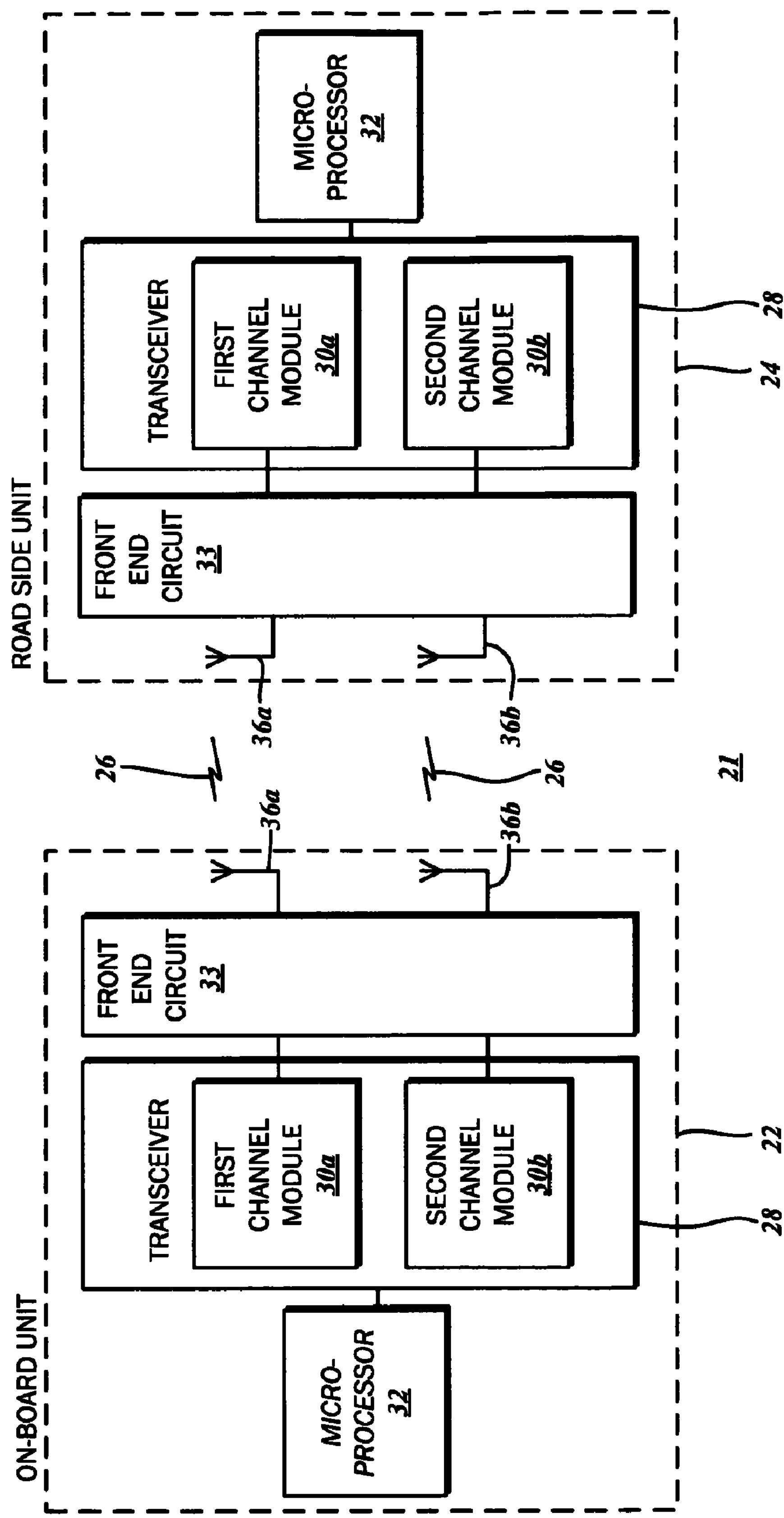
FIG. 1 is a block diagram illustrating a multi-channel radio frequency (RF) transceiver front end circuit in accordance with various embodiments of the present invention in the context of an exemplary IEEE 802.11p Wireless Access in Vehicle Environments (WAVE) data communications system.

Referring now to the block diagram of FIG. 1, an exemplary dual channel communications system 21 includes a local node 22 and a remote node 24 that transmit and receive signals of encoded data to/from each other. By way of example only and not of limitation, the dual channel communications system 21 conforms to the IEEE 802.11p Wireless Access in Vehicular Environments (WAVE) standard, and all radio transmissions 26 between the local node 22 and the remote node 24 are understood to be in conformity therewith. As briefly mentioned above, the nodes transmit and receive data over the same communications medium, that is, the designated radio frequency (RF) channel, via time domain duplexing. It will be that while the present disclosure references the WAVE system specifically when considering various embodiments, any other dual channel, time domain duplex systems that have stringent sensitivity and data throughput specifications such as Evolved EDGE (Enhanced Data Rates for GSM Evolution) may be readily substituted.

The local node 22 may be, for example, a vehicle, while the remote node 24 may be another vehicle or a stationary unit installed along the road or other transportation infrastructure. In the local node 22, the components therein are referred to as an on-board unit, while stationary units may be referred to as road-side units. Regardless of the specific designation, the local node 22 and the remote node 24 both include a transceiver 28 that has a first channel module 30*a* and a second channel module 30*b*. In particular, the first channel module 30*a* is understood to include an RF receiver and an RF transmitter operating on one channel, and the second channel module 30*b* likewise has an RF receiver and an RF transmitter operating on another channel. The first channel module 30*a* and the second channel module 30*b* may be selectively tuned to the operating frequency of the specified channel. A microprocessor 32 may provide the data to be transmitted from the local node 22 to the remote node 24 and vice versa, as well as decode the data received by the local node 22 from the remote 24 and vice versa for further processing, among other functions.

Because the transceiver 28 generally does not generate sufficient power or have sufficient sensitivity necessary for reliable communications, additional conditioning of transmitted and received RF signals is necessary. In this regard, the local node 22 and the remote node 24 include a front end module 33, which is understood to encompass any circuitry between the transceiver 28 and the antenna 36. The front end module 33 includes a power amplifier to increasing transmission power, and/or a low noise amplifier for increased reception sensitivity. As will be described in further detail, various filter circuits such as band pass filters may also be included to provide clean transmission signals to the antenna 36, and/or to protect the reception circuitry.

Figure 2:
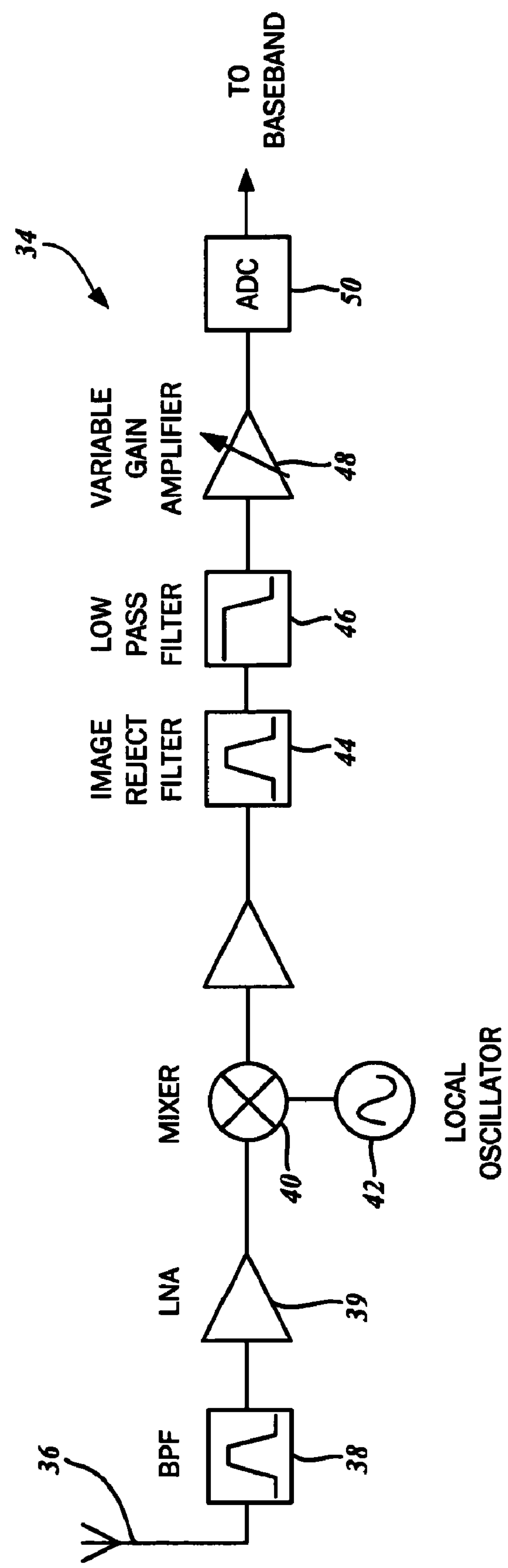
FIG. 2 is a block diagram of a conventional RF receiver architecture.

Referring to FIG. 2, a low intermediate frequency (IF) receiver architecture 34 may be utilized in the transceivers 28. The electromagnetic RF signal is converted to electrical current by an antenna 36. The signal is passed through an RF band-select or band-pass filter 38 that covers a wide frequency band to encompass all possible operational frequencies of the applicable standard. The band pass filter 38 is understood to reject signals reaching the antenna 36 that may be from unwanted sources that are outside the operating frequency band. The filtered signal is then amplified by a low noise amplifier 39 that increases the power of the signal to a level sufficient for a mixer 40. A local oscillator 42 generates a signal that is used to down-convert the received signal to an IF signal, and is passed to an image reject filter 44 to accept only a signal within a predefined frequency band. The signal may be passed through a low pass filter 46 to further reject out-of-band signals and mixing products. Thereafter, a variable gain amplifier 48 amplifies the resulting signal, and is converted to a digital signal with an analog-to-digital converter (ADC) 50. The digital signal is provided to baseband circuitry for further processing. The receiver 34 is one example of a channel-select filter, and any other architecture may be substituted. For example, a zero-IF receiver architecture may be utilized, where the RF signal is down-converted to a baseband signal in single or multiple steps.

Figure 3:
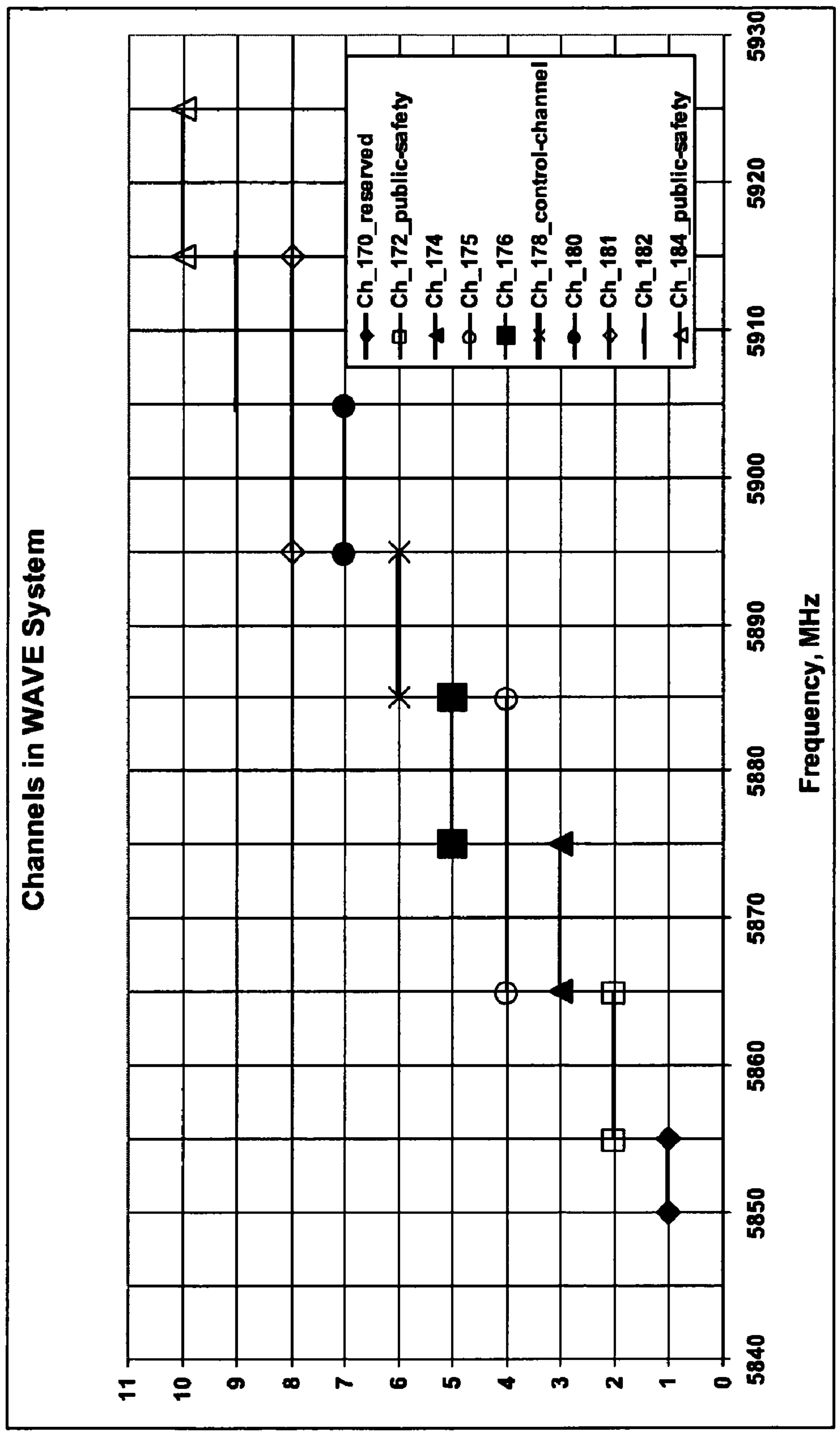
FIG. 3 is a graph illustrating the frequency range for different channels in a WAVE data communications system.
Figure 4:
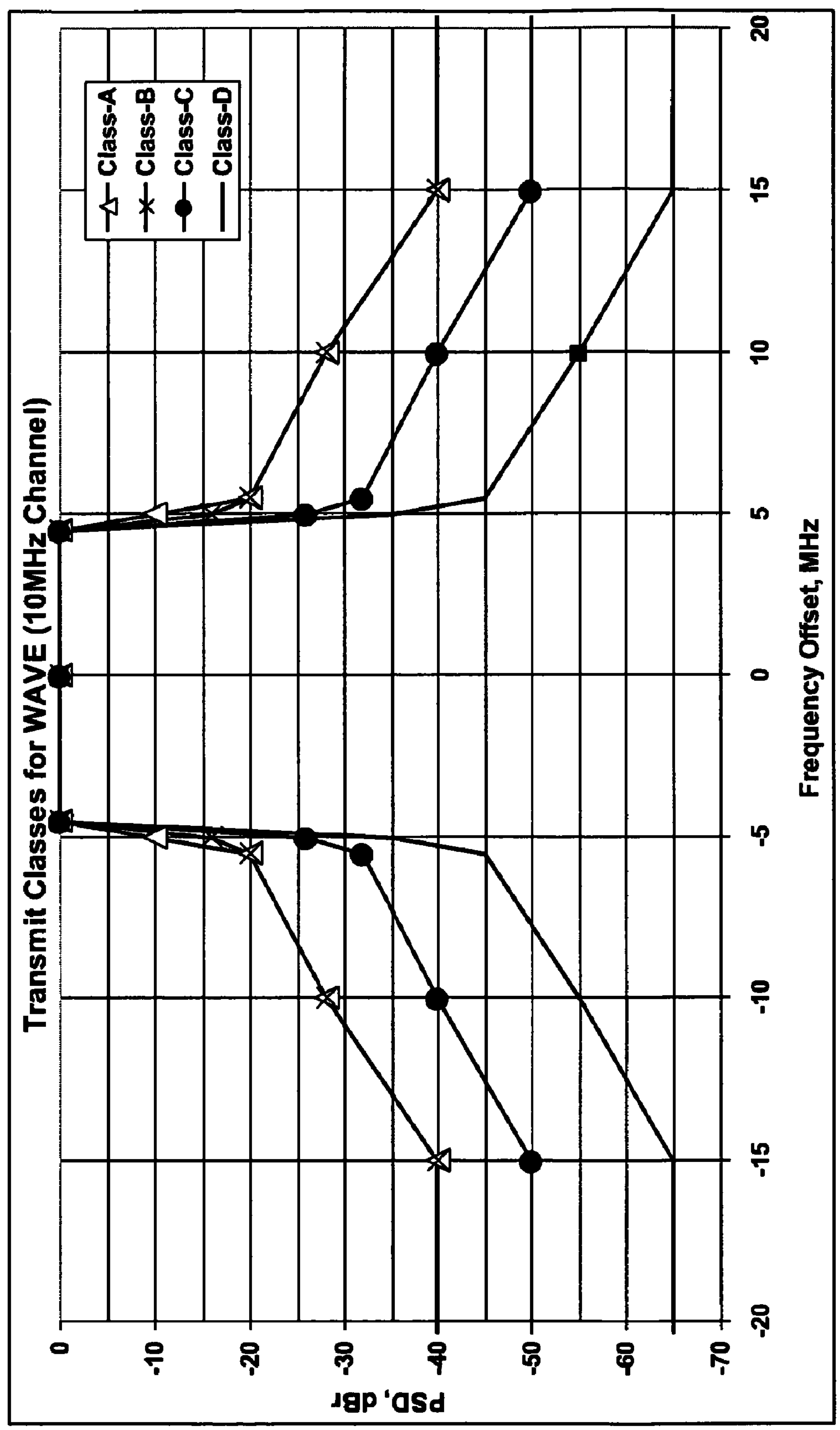
FIG. 4 is a graph illustrating the power spectral density of different transmit classes in a WAVE system.

As best illustrated in FIG. 3, under the WAVE standard, numerous channels or frequency ranges around 5.9 GHz for the RF signal are defined. Each of the channels overlaps in various degrees with neighboring channels, and some channels have wider frequency ranges than others. A control channel (Ch_178) is spaced as far apart as possible from the two public safety channels (Ch_172 and Ch_184) to minimize noise. The remaining channels are utilized for a variety of other services as discussed above. Despite the minimal frequency separation between two different channels, typically on the order of 20 MHz, one embodiment of the present invention contemplates independent operation of transceivers at the two frequencies. The graph of FIG. 4 shows the power spectral density (in dBr), that is, the distribution of instantaneous power across different frequency offsets, of different WAVE transmission classes in a 10 MHz channel. It is understood that 5 MHz, as well as 20 MHz channels have similar spectrum masks as shown.

Figure 5:
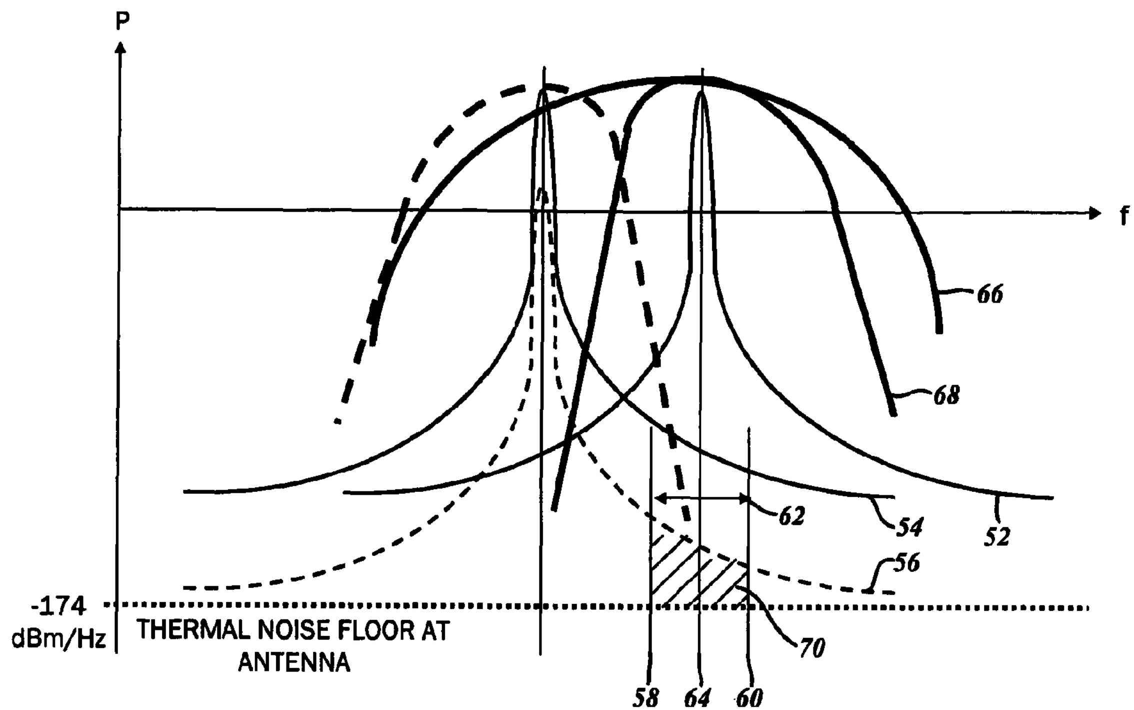
FIG. 5 is a graph showing the power spectral characteristics of dual-channel systems.

With reference to the graph of FIG. 5, the spectral characteristics of dual-channel transmissions received by the transceiver 28 and the filtering objectives of the RF receiver architecture 34 will be considered. Specifically, the graph illustrates the case where both antennas are transmitting at alternate channels. A first plot 52 represents the signal of a selected channel at the first antenna 36*a*, a second plot 54 represents the signal of the alternate channel at the second antenna 36*b*, and a third plot 56 represents the signal of the alternate channel at the first antenna 36*a*. A channel low-end frequency 58 and a channel high-end frequency 60 defining a channel bandwidth 62, and encompasses that portion of the selected signal that has a greater power than a predefined threshold value. A channel middle frequency 64 represents the frequency at which peak power is outputted. A fourth plot 66 depicts an exemplary filter response where the frequency offset between adjacent channels is minimal, thus making the rejection of the alternate channel difficult. A fifth plot 68 is an alternative exemplary filter response that sufficiently rejects the alternate channel. As shown in the fourth plot 66 and the fifth plot 68, diplexer-type rejection characteristics may be useful to cut wide-band noise from the alternate channel. Even with filtering the alternate channel as set forth above, some level of noise from the alternate channel may remain as depicted in a noise region 70. The various plots above show that the spectrum shoulders from one transmit channel fall within the central frequency region of the other channel. If the other channel is in the receive mode, then noise from the transmitting channel is understood to degrade the noise floor.

Figure 6:
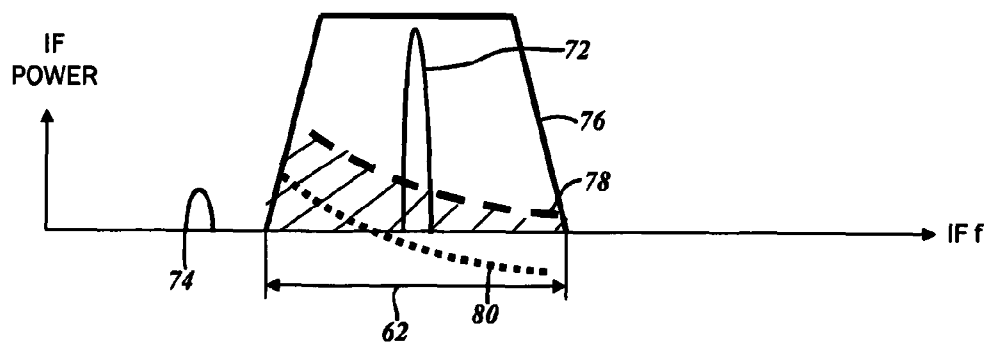
FIG. 6 is a graph of intermediate frequency (IF) signals and noise superimposed over IF filter responses.

The graph of FIG. 6 illustrates the spectral characteristics of the intermediate frequency signal after processing by the image reject filter 44 and the low pass filter 46 of the RF receiver architecture 34 depicted in FIG. 2. A first plot 72 is representative of the useful signal for the selected channel, and a second plot 74 is representative of the signal for the rejected, alternate channel. A third plot 76 shows an exemplary response of the channel-select intermediate frequency (IF) filter, that is, the image reject filter 44 and the low pass filter 46. The channel-select IF filter has a pass-band bandwidth generally corresponding to the channel bandwidth 62. Notwithstanding the filter, wideband noise from the alternate channel may remain within the frequency range of the selected channel, as depicted by a fourth plot 78. However, it is understood that as the physical distance between the first antenna 36*a* and the second antenna 36*b* is increased, the noise level may decrease as shown in a fifth plot 80.

Figure 7:
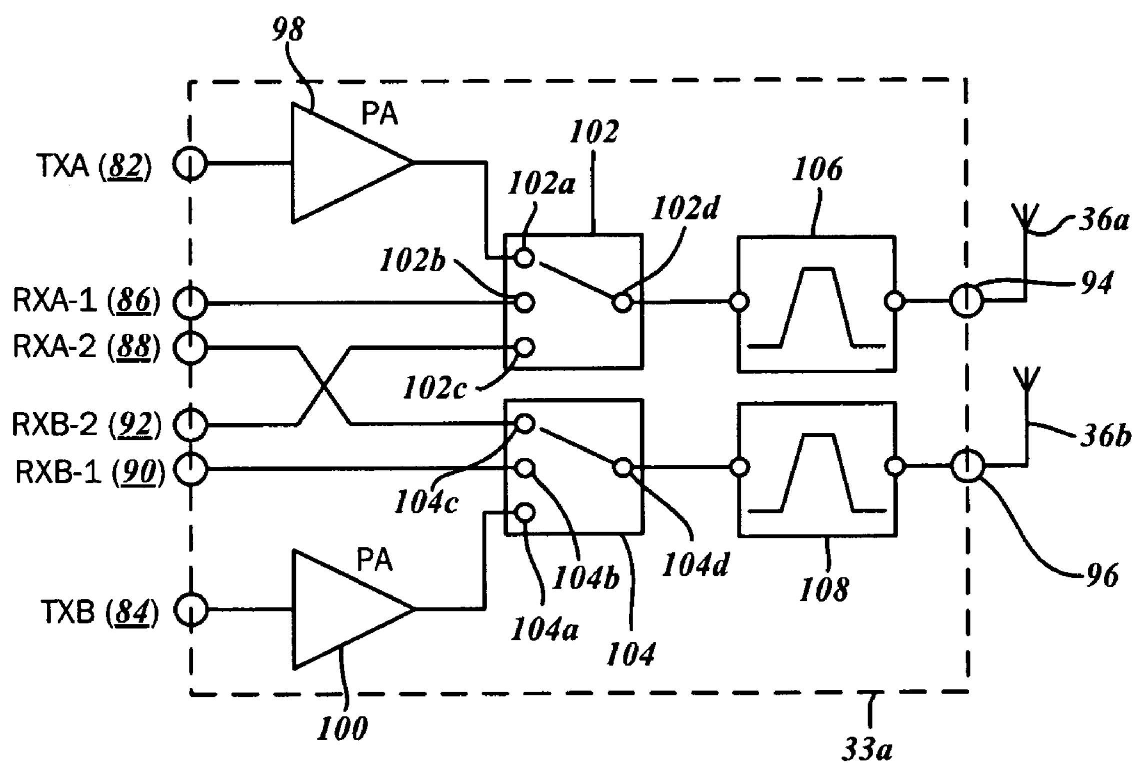
FIG. 7 is a schematic diagram of a first embodiment of the multi-channel RF transceiver front end circuit.

Having considered the various operational parameters of simultaneous operation, dual-channel time-domain duplex communications systems such as WAVE, further details regarding the various embodiments of the front end module 33 will be described. The schematic diagram of FIG. 7 illustrates a first embodiment of the front end module 33*a*. As discussed above, the front end module 33 is connectible to the transceiver 28 that includes the first channel module 30*a* for one operational frequency or channel, and the second channel module 30*b* for the other operational frequency or channel. According to various embodiments, each of the first and second channel modules 30*a*, 30*b* includes a transmit line, a primary receive line, and a secondary receive line. The primary receive line and the secondary receive line are understood to be connectible to the two spatially separated antennas 36 for multipath mitigation purposes. This configuration is also referred to as antenna diversity. Along these lines, the front end module 33*a* includes a first antenna port 94 connectible to the first antenna 36*a* and a second antenna port 96 connectible to the second antenna 36*b*.

The front end module 33*a* also includes various ports corresponding to the inputs and outputs of the transceiver 28. In particular, the front end module 33*a* includes a first transmit port (TXA) 82 that is tied to the transmit line of the first channel module 30*a*, and a second transmit port (TXB) 84 that is tied to the transmit line of the second channel module 30*b*. Additionally, the front end module 33*a* includes a first primary receive port (RXA-1) 86 and a first secondary receive port (RXA-2) 88 that are tied to the primary receive line and the secondary receive line, respectively, of the first channel module 30*a*. The front end module 33*a* also includes a second primary receive port (RXB-1) 90 and a second secondary receive port (RXB-2) 92 tied to the primary receive line and the secondary receive line, respectively, of the second channel module 30*b*.

At the basic level, the front end module 33*a* includes a first power amplifier 98, a second power amplifier 100, a first single pole, triple throw (SP3T) switch 102, a second single pole, triple throw (SP3T) switch 104, a first band-pass filter 106, and a second band-pass filter 108. The first and second SP3T switches 102, 104 are understood to selectively set the front end module 33*a* to one of a transmit mode and two receive modes.

With further particularity, the first SP3T switch 102 is understood to have a first terminal 102*a* that is connected to the first power amplifier 98, with the input thereof being tied to the first transmit port 82. Similarly, the second SP3T switch 102 has a first terminal 104*a* that is connected to the second power amplifier 100 with its input tied to the second transmit port 84. The first SP3T switch 104 also has a common terminal 102*d* that is tied to the first band-pass filter 106, which in turn is tied to the first antenna port 94. The second SP3T switch 104 likewise has a common terminal 104*d* tied to the second band pass filter 108, which in turn is tied to the second antenna port 96. In the transmit mode for either or both of the channels, the respective one of the common terminals 102*d*, 104*d* are connected to the corresponding first terminals 102*a*, 104*a*. It is expressly contemplated that the two channels are independent of one another, and signals of the same frequency band can be transmitted simultaneously with only a small influence on each other. Along these lines, packet width and duty cycles may differ between the two channels.

In the receive mode of the first channel, the first SP3T switch 102 connects the common terminal 102*d* thereof to a second terminal 102*b*, thereby passing the signal from the first antenna 36*a* to the first primary receive port 86 over the first band pass filter 106. Additionally, the second SP3T switch 104 connects its common terminal 104*d* to a third terminal 104*c*. This ties the second antenna 36*b* to the first secondary receive port 88 over the second band pass filter 108.

With respect to the receive mode of the second channel, the second SP3T switch 104 connects the common terminal 104*d* to a second terminal 104*b*, while the first SP3T switch 102 connects its common terminal 102*d* to a third terminal 102*c* that is tied to the second secondary receive port 92. Additionally, the second terminal 104*b* of the second SP3T switch 104 is tied to the first secondary receive port 90. The signal received through the first antenna 36*a* is thus filtered by the first band-pass filter 106 and passed to the second secondary receive port 92, and the signal received through the second antenna 36 is filtered by the second band pass filter 108 and passed to the first secondary receive port 90. The two channels in the receive modes are also understood to be independent of each other, that is, there is no time-based synchronization.

The first band pass filter 106 and the second band pass filter 108 are contemplated to have identical configurations, with low insertion loss within the operating frequency band, that is, less than 2 dB at the 4.9 GHz to 5.9 GHz WAVE operational frequencies, and high rejection outside of the operating frequency band. It is envisioned that the operational frequency band corresponds to WAVE and WLAN, such that simultaneous operation of both systems is possible, and the transceiver is capable of operating over both communication protocols with the same front end circuit. The identical configuration of the first band pass filter 106 and the second band pass filter 108 aid in size and cost reductions.

A number of approaches to isolating one signal chain from the other are envisioned according to various embodiments of the present invention. In particular, the first SP3T switch 102 and the second SP3T switch 104 are understood to have at least a 20 dB isolation between the first terminals 102*a*, 104*a*, respectively, and the third terminals 102*c*, 104*c*, respectively, so that one transmitting channel does not interfere with receiving signals of the alternate channel. Additionally, isolation between the first antenna 36*a* and the second antenna 36*b* is also maximized, e.g., greater than 40 dB, by greater spatial separation and optimization of directivity and polarization properties. In the WAVE communications system 21, the first antenna 36*a* and the second antenna 36*b* may be mounted on opposing sides of the vehicle such as side mirrors, for example.

As briefly mentioned above, in the first receive mode, the first antenna 36*a* is connected to the first primary receive port 86, and the second antenna 36*b* is connected to the first secondary receive port 88. The connections in the first SP3T switch 102 and the second SP3T switch 104 are made in dedicated time frames, and there is understood to be no signal on the first transmit port 82 or the second transmit port 84. This configuration is understood to provide receiver diversity for the first channel, and the sensitivity of the receivers in the first channel module 30*a* of the transceiver 28 is maximized.

Relatedly, it is also contemplated that the first antenna 36*a* is connected to the second secondary receive port 92, and the second antenna 36*b* is connected to the second primary receive port 90. Again, the connections in the first SP3T switch 102 and the second SP3T switch 104 are made in dedicated time frames, and there is no signal on the first transmit port 82 or the second transmit port 84. In this configuration, receiver diversity for the second channel is provided, and the sensitivity of the receivers in the second channel module 30*b* is maximized.

As also indicated above, however, the first antenna 36*a* may be connected to the first primary receive port 86 independently of the second antenna 36*b* being connected to the first secondary receive port 88. The first antenna 36*a* may also be connected to the second secondary receive port 92 independently of the second antenna 36*b* being connected to the second primary receive port 90. If the transmit chain for a given channel is active instead, that is, there is a signal on one of the transmit ports 82, 84 being amplified by a corresponding one of the power amplifiers 98, 100 and connected to one of the antennas 36, then one of the receive chains of the alternate channel is, by definition, not active. Accordingly, the sensitivity of the receiver for either the first channel module 30*a* or the second channel module 30*b* of the transceiver 28 is reduced.

When transmit chains for channels are active, that is, when the first transmit port 82 is connected to the first antenna 36*a* and the second transmit port 84 is connected to the second antenna 36*b*, the receive chains for both channels are inactive and the antennas are disconnected from the receive ports. Thus, the receiver components of the transceiver 28 are protected from large signal leakage.

Figure 8:
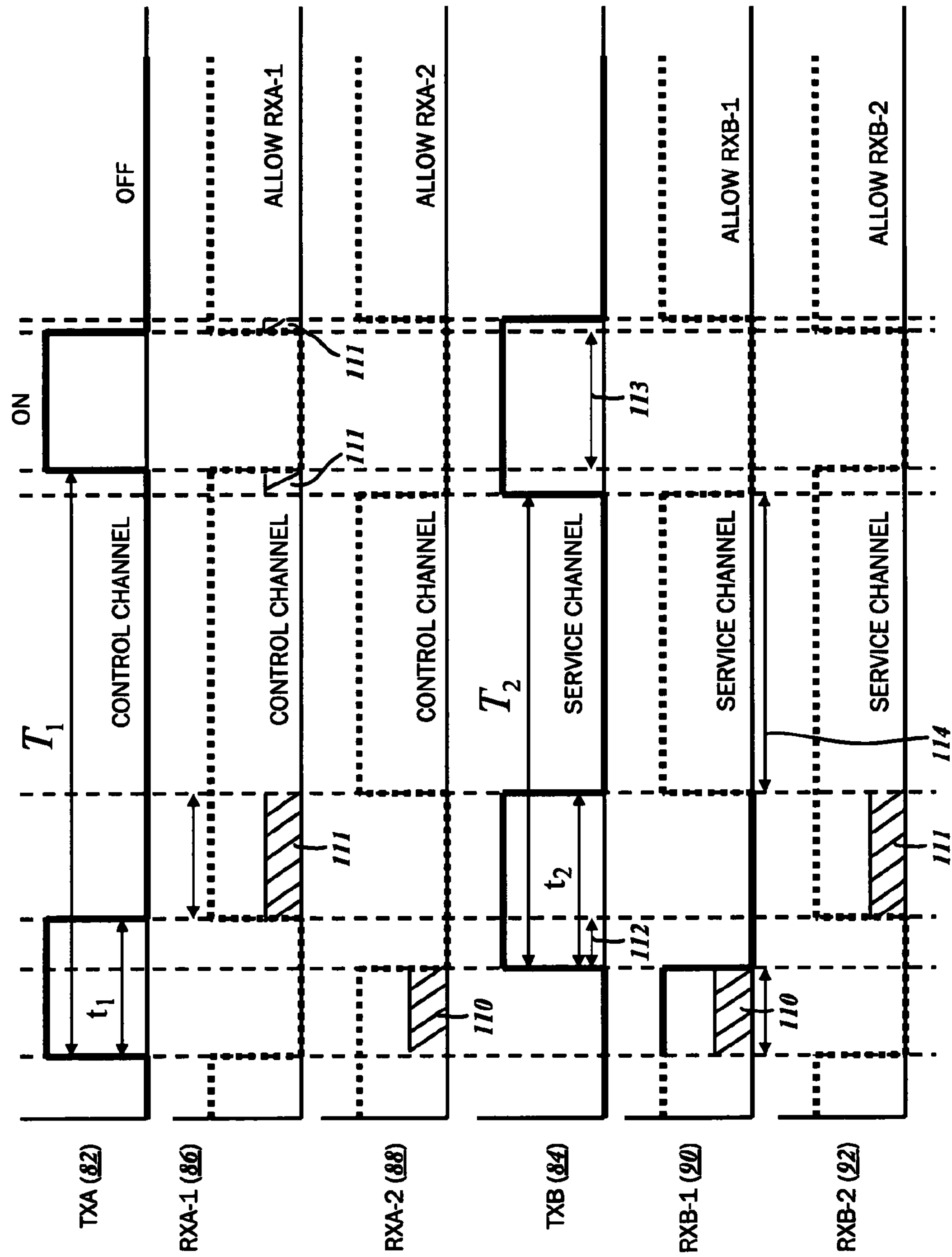
FIG. 8 is an exemplary timing diagram showing one contemplated operational sequence of the first embodiment of the multi-channel RF transceiver front end circuit shown in FIG. 7.

FIG. 8 best illustrates an exemplary operational sequence of the first embodiment of the front end module 33*a*, includes a plot of signals on the first transmit port 82, the second transmit port 84, the first primary receive port 86, the first secondary receive port 88, the second primary receive port 90, and the second secondary receive port 92. For the sake of convenience, the plots of the signals on the various ports are designated by the corresponding reference numbers thereof. Furthermore, by way of example only and not of limitation, the first channel, that is, those signals on the first transmit port 82, the first primary receive port 86, and the first secondary receive port 88 are associated with the control channel under the WAVE standard. Additionally, the second channel, that is, those signals on the second transmit port 84, the second primary receive port 90, and the second secondary receive port 92 are associated with the service channel.

The dotted lines in the timing diagram represent segments of time where signal reception is allowed and disallowed based upon the status of the first transmit port 82 and the second transmit port 84. Actual signal reception is indeterminate, and may vary during actual use. The timing diagram shows that in the interval t1, the first transmit port 82 is active, while the first primary receive port 86 and the second secondary receive port 92 are inactive. In the time interval t2, the first secondary receive port 90 and the second primary receive port 88 are inactive. Between activating the first transmit port 82 and the second transmit port 84, the first secondary receive port 88 and the second primary receive port 90 have a period of reduced sensitivity 110.

As discussed above, in a time period 112 and 113 where both the first transmit port 82 and the second transmit port 84 are active, all receive ports are inactive. Furthermore, in time period between deactivating the primary transmit port 82 while the secondary transmit port 84 is active, and deactivating the second transmit port 84, the first primary receive port 86 and the second secondary receive port 92 have a period of reduced sensitivity 111. This is understood to be caused by power leakage from the second transmit port 84.

In a time period 114 where both the primary transmit port 82 and the second transmit port 84 are inactive, it is possible for the first receive ports 86, 88 or the second receive ports 90, 92 to be activated. It is understood, however, that the first primary receive port 86 and the second secondary receive port 92 cannot be simultaneously activated, and that the second primary receive port 90 and the first secondary receive port 88 likewise cannot be simultaneously activated.

Figure 9:
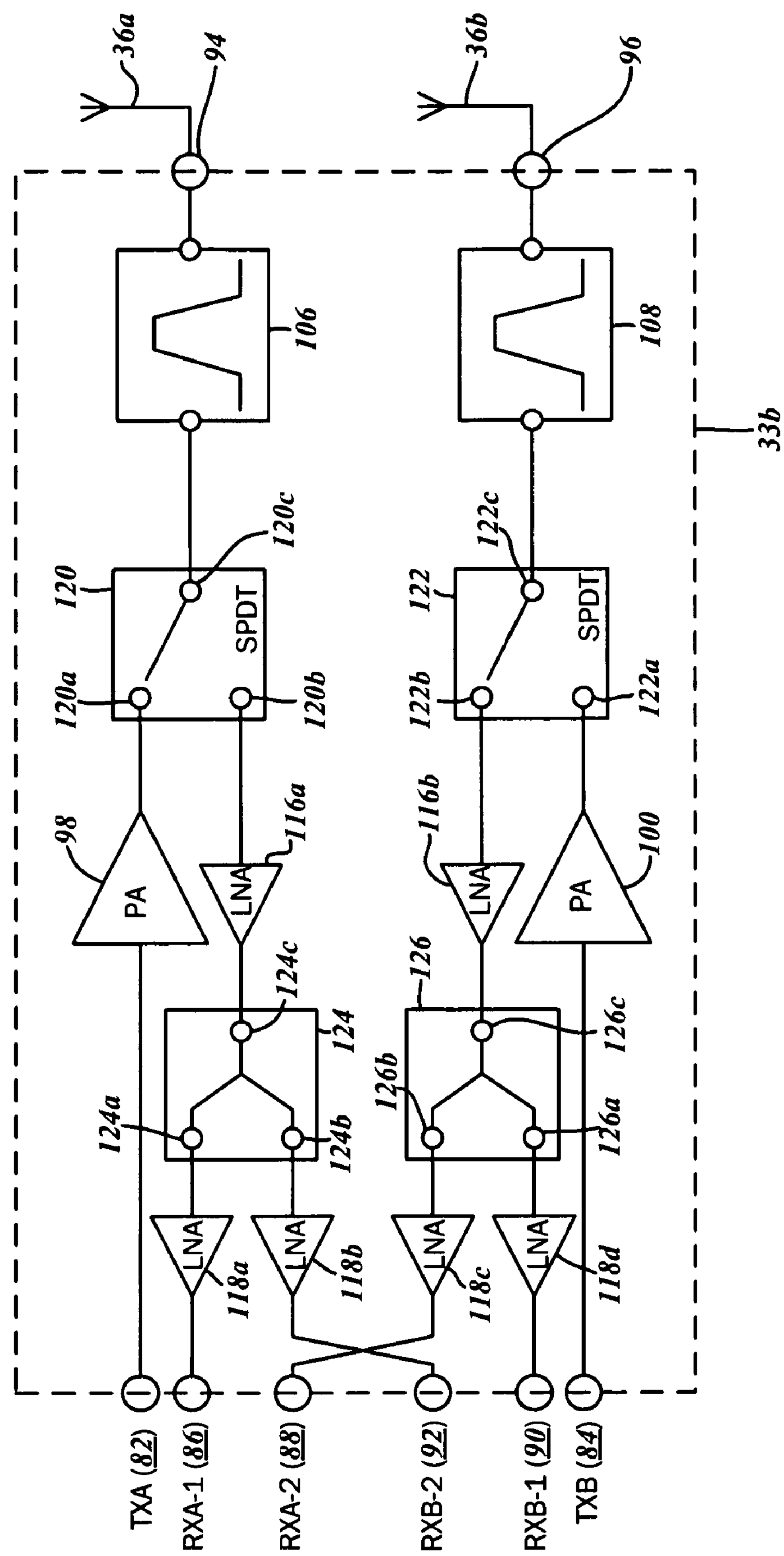
FIG. 9 is a schematic diagram of a second embodiment of the multi-channel RF transceiver front end circuit with full receive diversity and connected to a first antenna and a second antenna.

FIG. 9 is a schematic diagram of a second embodiment of the front end module 33*b*. As will be detailed further below, this embodiment contemplates a longer allowable time frame for the receiver 34 in order to increase data throughput. As in the first embodiment discussed above, the front end module 33*b* includes the first antenna port 94 that is connectible to the first antenna 36*a* and the second antenna port 96 connectible to the second antenna 36*b*. Furthermore, the front end module 33*b* includes the first transmit port 82 that is tied to the transmit line of the first channel module 30*a*, and the second transmit port 84 that is tied to the transmit line of the second channel module 30*b*. Additionally, there is the first primary receive port 86 and the first secondary receive port 88 that are tied to the primary receive line and the secondary receive line, respectively, of the first channel module 30*a*. The front end module 33*b* also includes the second primary receive port 90 and the second secondary receive port 92 tied to the primary receive line and the secondary receive line, respectively, of the second channel module 30*b*.

Generally, the second embodiment of the front end module 33*b* includes many of the same components as the first embodiment 33*a*. Amongst the shared components include the first power amplifier 98, the second power amplifier 100, the first band pass filter 106, and the second band pass filter 108. Additionally, the front end module 33*b* includes first stage low noise amplifiers 116*a-b*, second stage low noise amplifiers 118*a-d*, a first single pole, double throw switch 120, a second single pole double throw switch 122, a first power splitter 124, and a second power splitter 126. The functional details of the additional components as relating to the front end module 33*b* will be described more fully below.

The front end module 33*b* may be broadly segregated into two equal sub-blocks, with one being related to the first channel, and the other being related to the second channel. Each sub-block is understood to have one transmit mode and three receive modes. In this regard, the first SPDT switch 120 and the second SPDT switch 122 generally select between the transmit mode and the receive modes.

As shown in FIG. 9, the first transmit port 82 is connected to an input of the first power amplifier 98. The output of the first power amplifier 98, in turn, is connected to a first terminal 120*a* of the first SPDT switch 120. A second terminal 120*b* of the first SPDT switch 120 is connected to the receive ports including the first primary receive port 86 and the second secondary receive port 92, as will be described in further detail below. A common terminal 120*c* of the first SPDT switch 120 is connected to the first band pass filter 106, then to the first antenna port 94, and the first antenna 36*a*. The second transmit port 84 is connected to an input of the second power amplifier 100. The output of the second power amplifier 100 is connected to a first terminal 122*a* of the second SPDT switch 122. A second terminal 122*b* of the second SPDT switch 122 is connected to the receive ports, that is, the first secondary receive port 88 and the second primary receive port 90. Similarly, a common terminal 122*c* of the second SPDT switch 122 is connected to the second band pass filter 108, which itself is connected to the second antenna port 96 and the second antenna 36*b*.

In the transmit mode of the first channel, the first power amplifier 98 is activated, and the first SPDT switch 120 connects the first terminal 120*a* to the common terminal 120*c*. The signal is amplified by the first power amplifier 98 and passes through the first band pass filter 106 to the first antenna port 94 and to first antenna 36*a*, from which the signal is broadcast. Furthermore, in the transmit mode of the second channel, the second power amplifier 100 is activated, and the second SPDT switch 122 connects the first terminal 122*a* to the common terminal 122*c*. The signal from the transceiver 28 on the second transmit port 84 is amplified by the second power amplifier 100, conditioned by the second band pass filter 108, and passed to the second antenna port 96.

In the first receive mode of the first channel, the first SPDT switch 120 connects the common terminal 120*c* to the second terminal 120*b*. The received signal from the first antenna 36*a* passes through the first band pass filter 106, and then to the first stage low noise amplifier 116*a* via the first SPDT switch 120. The output of the first stage low noise amplifier 116*a* is connected to a common port 124*c* of the first power splitter 124, and in accordance with one embodiment, the amplified signal is evenly split between a first split port 124*a* and a second split port 124*b* of the first power splitter 124. The signal on the first split port 124*a* is amplified by the second stage low noise amplifier 118*a*, the output of which is connected to the first primary receive port 86. In the first receive mode, only the low noise amplifier 118*a* is activated, so despite the signal being split and passed to the low noise amplifier 118*b*, it is not amplified and passed to the second secondary receive port 92.

In the second receive mode of the first channel, again, the received signal from the first antenna 36*a* passes through the first band pass filter 106 to the first stage low noise amplifier 116*a* via the first SPDT switch 120, which has connected the common terminal 120*c* to the second terminal 120*b*. The amplified signal from the first stage low noise amplifier 116*a* is passed to the first power splitter 124, which evenly splits the signal between the first split port 124*a* and the second split port 124*b*. Because only the low noise amplifier 118*b* is activated in this mode, even though a signal is present on the first split port 124*a*, it is not amplified and passed to the first primary receive port 86.

In the third receive mode of the first channel, the received signal from the first antenna 36*a* is passed to the common port 124*c* of the first power splitter 124 over the first band pass filter 106, the first SPDT switch 120, and the first stage low noise amplifier 116*a*. As indicated above, the amplified signal is split evenly between the first split port 124*a* and the second split port 124*b*. Both of the low noise amplifiers 118*a*, 118*b* are activated, thereby passing the received signal to both the first primary receive port 86 and the second secondary receive port 92.

It is contemplated that the first channel and the second channel sub-blocks function identically, although each sub-block is controlled and operated independently. Thus, in the first receive mode of the second channel, the second SPDT switch 122 connects the common terminal 122*c* to the second terminal 122*b*. The received signal from the second antenna 36*b* passes through the second band pass filter 108, and then to the first stage low noise amplifier 116*b* via the second SPDT switch 122. The output of the first stage low noise amplifier 116*b* is connected to a common port 126*c* of the second power splitter 126. The amplified signal is evenly split between a first split port 126*a* and a second split port 126*b*.

The signal on the first split port 126*a* is amplified by the second stage low noise amplifier 118*d*, the output of which is connected to the first secondary receive port 90. In the first receive mode, only the low noise amplifier 118*d* is activated, so although the signal is split and passed to the low noise amplifier 118*d*, it is not amplified and passed to the second primary receive port 88.

In the second receive mode of the second channel, the received signal from the second antenna 36*b* passes through the second band pass filter 108 to the first stage low noise amplifier 116*b* via the second SPDT switch 122, which has connected the common terminal 122*c* to the second terminal 122*b*. The amplified signal from the first stage low noise amplifier 116*b* is passed to the second power splitter 126, which evenly splits the signal between the first split port 126*a* and the second split port 126*b*. Because only the low noise amplifier 118*c* is activated in this mode, even though a signal is present on the first split port 126*a*, it is not amplified and passed to the first secondary receive port 90.

In the third receive mode of the second channel, the received signal from the second antenna 36*b* is passed to the common port 126*c* of the second power splitter 126 over the second band pass filter 108, the second SPDT switch 122, and the first stage low noise amplifier 116*b*, as in the first and second receive modes discussed previously. As indicated above, the amplified signal is split evenly between the first split port 126*a* and the second split port 126*b*. Both of the low noise amplifiers 118*c*, 118*d* are activated, thereby passing the received signal to both the first secondary receive port 88 and the second primary receive port 90.

As with the first embodiment 33*a*, the second embodiment of the front end module 33*b* contemplates the first band pass filter 106 and the second band pass filter 108 having identical configurations with low insertion loss within the operating frequency band (less than 2 dB at 4.9 GHz to 5.9 GHz WAVE operational frequencies), and high rejection outside of the operating frequency band. As indicated above, the operational frequency band corresponds to WAVE and WLAN, such that simultaneous operation of both systems is possible, and the transceiver is capable of operating over both communication protocols with the same front end circuit. Along these lines, the various approaches to isolating one signal chain from the others are likewise the same as with the first embodiment 33*a* discussed above.

One variation of the first power divider 124 and the second power divider 126 utilized in the second embodiment of the front end module 33*b* is disclosed in Applicant's co-pending patent application U.S. patent application Ser. No. 12/467,049 filed May 15, 2009 entitled RADIO FREQUENCY POWER DIVIDER AND COMBINER CIRCUIT, which is expressly incorporated by reference in its entirety herein. Generally, the power dividers 124, 126 are configured to have a minimal power loss from the common port 124*c*, 126*c* to the first split ports 124*a*, 126*a*, and to the second split ports 124*b*, 126*b*, respectively. One embodiment contemplates a loss of less than 0.5 dB. Additionally, isolation between the first split ports 124*a*, 126*a*, and the second split ports 124*b*, 126*b*, respectively, is maximized when the common ports 124*c*, 126*c* is matched in the operating frequency range. As mentioned above, the power split between the first split port 124*a* and the second split port 124*b*, as well as the first split port 126*a* and the second split port 126*b* are even, and is approximately 3 dB less than the power applied at the common ports 124*c*, 126*c*, respectively. Along these lines, the impedance values at the common ports 124*c*, 126*c* are understood to be half that at the first split ports 124*a*, 126*a*, and the second split ports 124*b*, 126*b*. Although the patent application mentioned above discloses a specific power splitter circuit, any other type such as Wilkinson dividers, lumped-element based dividers, coupled inductor based dividers, and so forth may be readily substituted by those having ordinary skill in the art.

With the first channel sub-block and the second channel sub-block are in the first receive mode and thus receiving the same channel, the signal received on the first antenna 36*a* is passed to the first primary receive port 86, and the signal received on the second antenna 36*b* is passed to the first secondary receive port 88. Receiver diversity for the first channel is thus provided, and the sensitivity of the receiver in the first channel is maximized.

When the first channel sub-block and the second channel sub-block are in the second receive mode, the signal received on the first antenna 36*a* is passed to the second secondary receive port 92, and the signal received on the second antenna 36*b* is passed to the second primary receive port 90. Receiver diversity for the second channel is likewise provided with the sensitivity of the receiver in the second channel is maximized.

As indicated above, the first channel sub-block and the second channel sub-block may operate independently with respect to one another. That is, the first antenna 36*a* may be connected to the first primary receive port 86 independently of the second antenna 36*b* being connected to the first secondary receive port 88. Along these lines, the first antenna 36*a* may also be connected to the second secondary receive port 92 independently of the second antenna 36*b* being connected to the second primary receive port 90. In those instances where there is no receive antenna diversity, it is understood that the overall sensitivity of the receiver 34 is reduced.

When the first transmit port 82 is connected to the first antenna 36*a* over the first SPDT switch 120, and second transmit port 84 is connected to the second antenna 36*b* over the second SPDT switch 122, the receive chains for the first channel sub-block and the second channel sub-block are inactive and disconnected from the respective antennas 36. The receiver components are therefore protected from large signal leakage.

Figure 10:
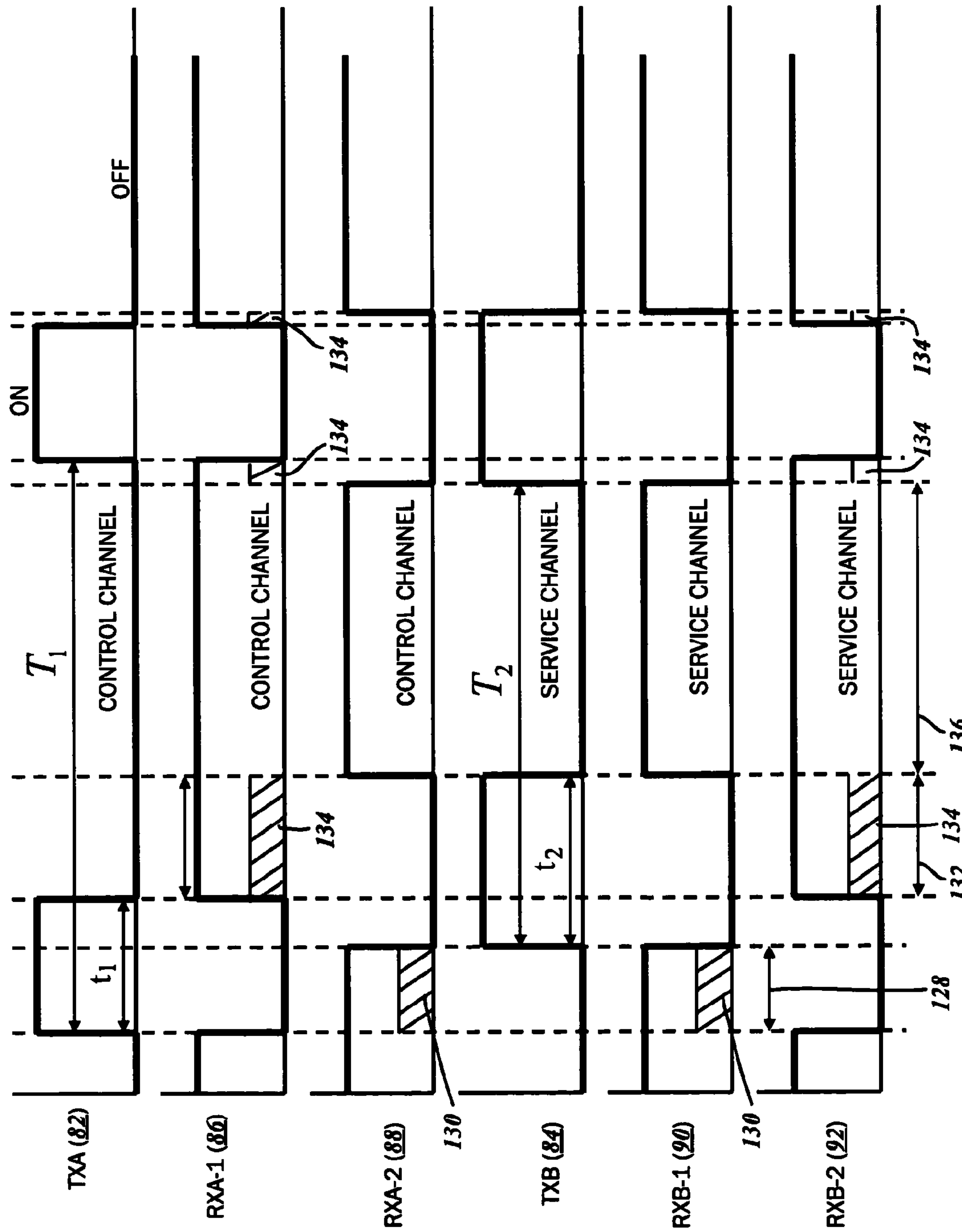
FIG. 10 is an exemplary timing diagram showing one contemplated operational sequence of the second embodiment of the multi-channel RF transceiver front end circuit shown in FIG. 9.

With reference to FIG. 10, one possible operational sequence of the second embodiment of the front end module 33*b* is illustrated. In further detail, it is contemplated that the activation of the first primary receive port 86 is exclusive of the activation of the first transmit port 82 during time period t1. However, since the activation of the first secondary receive port 88 is independent of the first transmit port 82, the two can be activated simultaneously. The activation of the second primary receive port 90 is exclusive of the activation of the second transmit port 84 during the time period t2. The activation of the second secondary receive port 92 is also independent of the second transmit port 84, and the two can likewise be activated simultaneously.

During a time period 128 in which the first transmit port 82 is activated and the second transmit port 84 is not activated, the first secondary receive port 88 and the second primary receive port 90 have a period of reduced sensitivity 130, as there is no antenna diversity and transmit signal leakage to the receiver. Along these lines, during a time period 132 when the second transmit port 84 is activated but the first transmit port 82 is not, the first primary receive port 86 and the second secondary receive port 92 also have a period of reduced sensitivity 134. In either of the periods of reduced sensitivity 130, 134, receiver training purposes such as original gain setting, phase lock loop (PLL) frequency setting and so forth may be completed.

When neither the first transmit port 82 nor the second transmit port 84 are active as in time period 136, all of the receive ports, that is, the first primary receive port 86, the first secondary receive port 88, the second primary receive port 90, and the second secondary receive port 92, may be simultaneously activated. Accordingly, full antenna diversity for both the control channel and the service channel is contemplated.

In accordance with one aspect of the present invention, the actual impact of the reduced sensitivity periods may be further reduced by better isolating the first antenna 36*a* from the second antenna 36*b*. The power level at the antennas is understood to be approximately 20 dbm in the 10 MHz channel bandwidth for a class-C transmitter and a −50 dBr rejection at an offset above 15 MHz from the signal edge. In this case, the channel power spectrum density at the antenna 36 while transmitting is −50 dBm/Hz, and the power spectrum density at an offset above 15 MHz is −100 dBm/Hz. Considering a noise figure of 3 dB for the first stage low noise amplifier 116*a-b*, the second stage low noise amplifier 118*a-d*, the SPDT switch 120,122 and a loss of 2 dB attributable to the band pass filters 106, 108, the noise floor at the antenna inside a channel band and at close frequency offsets is −169 dBm/Hz. Accordingly, with the power spectrum density at an offset above 15 MHz being −100 dBm/Hz, the isolation between the two antennas 36 is 69 dB for an overall receiver sensitivity decreased by 3 dB. With an isolation of 76 dB, the overall receiver sensitivity is may be reduced by 1 dB.

The reduction in receiver sensitivity is understood to be only for the period when one channel is transmitting and the other channel is receiving, as described above. With time domain duplex communications systems such as WLAN and WAVE that employ short burst intervals, the probability of overlap may be greatly reduced, particularly if the two channels are operating independently. The probability p1 of the first transmit port 82 being active is given by t1/T1, and the probability p2 of the second transmit port 84 being active is given by t2/T2. Further, the probability p that the two active state overlap is p1*p2, or (t1×t2)/(T1×T2). Therefore, with re-transmission of lost data, overall impact on data throughput may be minimal.

Figure 11:
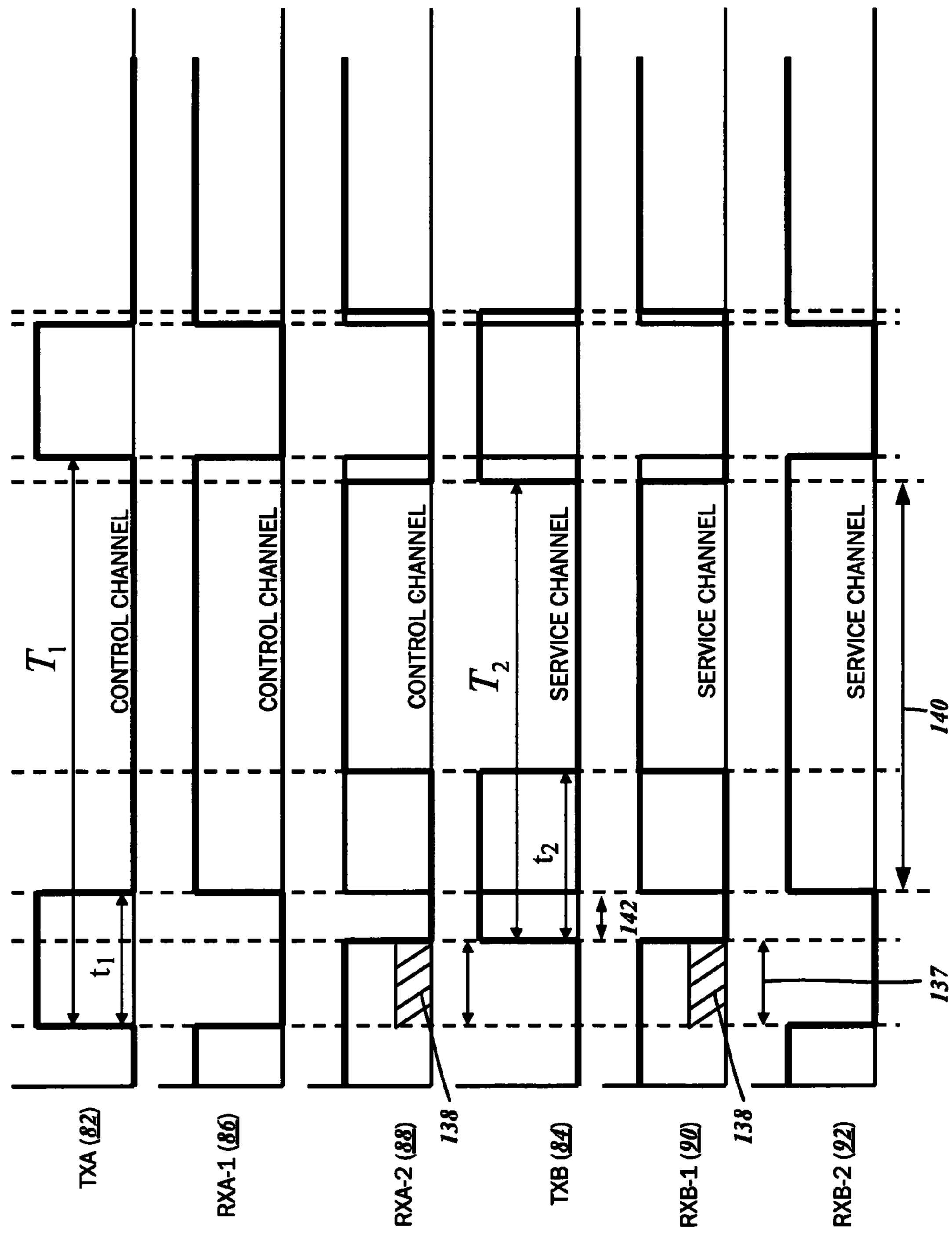
FIG. 11 is another exemplary timing diagram showing an operational sequence of the second embodiment of the multi-channel RF transceiver front end circuit shown in FIG. 9.

In WAVE applications that involve the control and public safety channels, even a minimal reduction in data throughput may not be acceptable because of the criticality of the information and the potentially grave safety consequences. The timing diagram of FIG. 11 shows another possible operational sequence of the second embodiment of the front end module 33*b*, in which the control channel is given priority in transmission and reception. The activation of the first transmit port 82, which is dedicated to the control channel, is fully independent. The first secondary receive port 88 and the second primary receive port 90 both have a period 137 of reduced sensitivity 138. The time period 137 is understood to be between the rising edge of the activation of the first transmit port 82, and the rising edge of the activation of the second transmit port 84. Furthermore, the first primary receive port 86 and the first secondary receive port 88 remain activated between the successive activations of the first transmit port 82, referenced as time period 140.

The activation of the second transmit port 84 is permitted only when the first transmit port 82 is activated, for example, a time period 142 that ends with the deactivation of the first transmit port 82. Because the probability of overlapping activations of the first transmit port 82 and the second transmit port 84, the transmit throughput of the service channel is understood to be low in comparison to the transmit throughput of the control channel. However, the second primary receive port 90 and the second secondary receive port 92 are likely to be simultaneously active with the first primary receive port 86 and the first secondary receive port 88.

Accordingly, the reception throughput of the service channel is high and thus suitable for downloading data.

Figure 12:
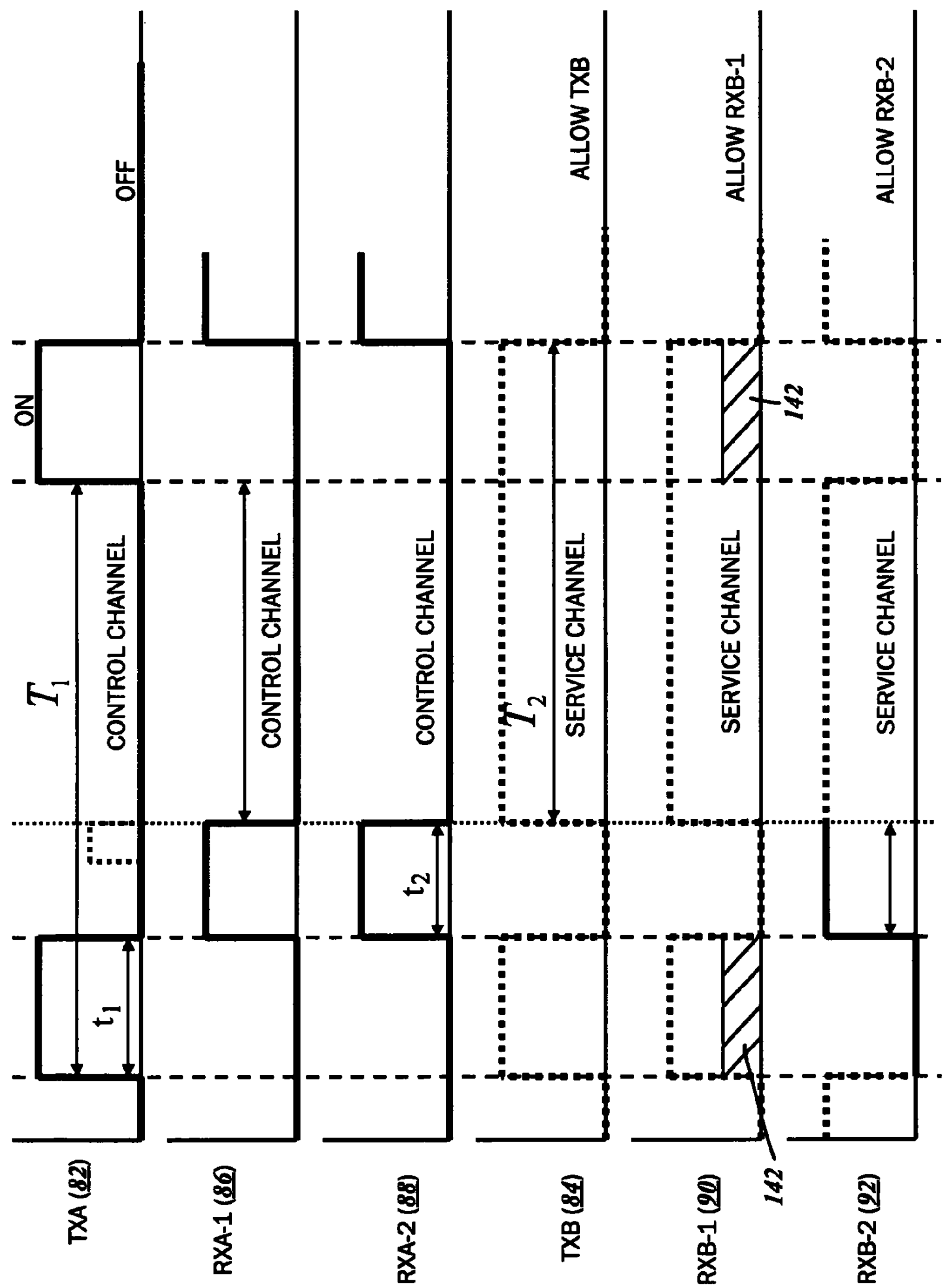
FIG. 12 is third exemplary timing diagram showing a different operational sequence of the second embodiment of the multi-channel RF transceiver shown in FIG. 9.

The timing diagram of FIG. 12 shows yet another possible operational sequence of the second embodiment of the front end module 33*b*. In this example, the control channel is given priority in transmission and full diversity in reception. While the first transmit port 82 is activated, no reception of the first channel occurs, and the first primary receive port 86 and the first secondary receive port 88 are deactivated. It is possible for the second transmit port 84 to be activated during this time period, and the second primary receive port 90 may be activated, albeit with a period of reduced sensitivity 142. Additionally, the second secondary receive port 92 is deactivated. In this regard, the timing of the second secondary receive port 92 is coupled with the timing of the first transmit port 82.

A time frame t2 is dedicated for receiving the control channel, and the first primary receive port 86 and the first secondary receive port 88 are activated. During this time, the second transmit port 84 is deactivated, as is the second primary receive port 90. However, it is possible for the second secondary receive port 92 to be activated, allowing reception of the service channel. The second transmit port 84 may be activated once the first primary receive port 86 and the first secondary receive port 88 are deactivated. As such, the timing of the second primary receive port 88 is coupled with the timing of the second transmit port 84.

Figure 13:
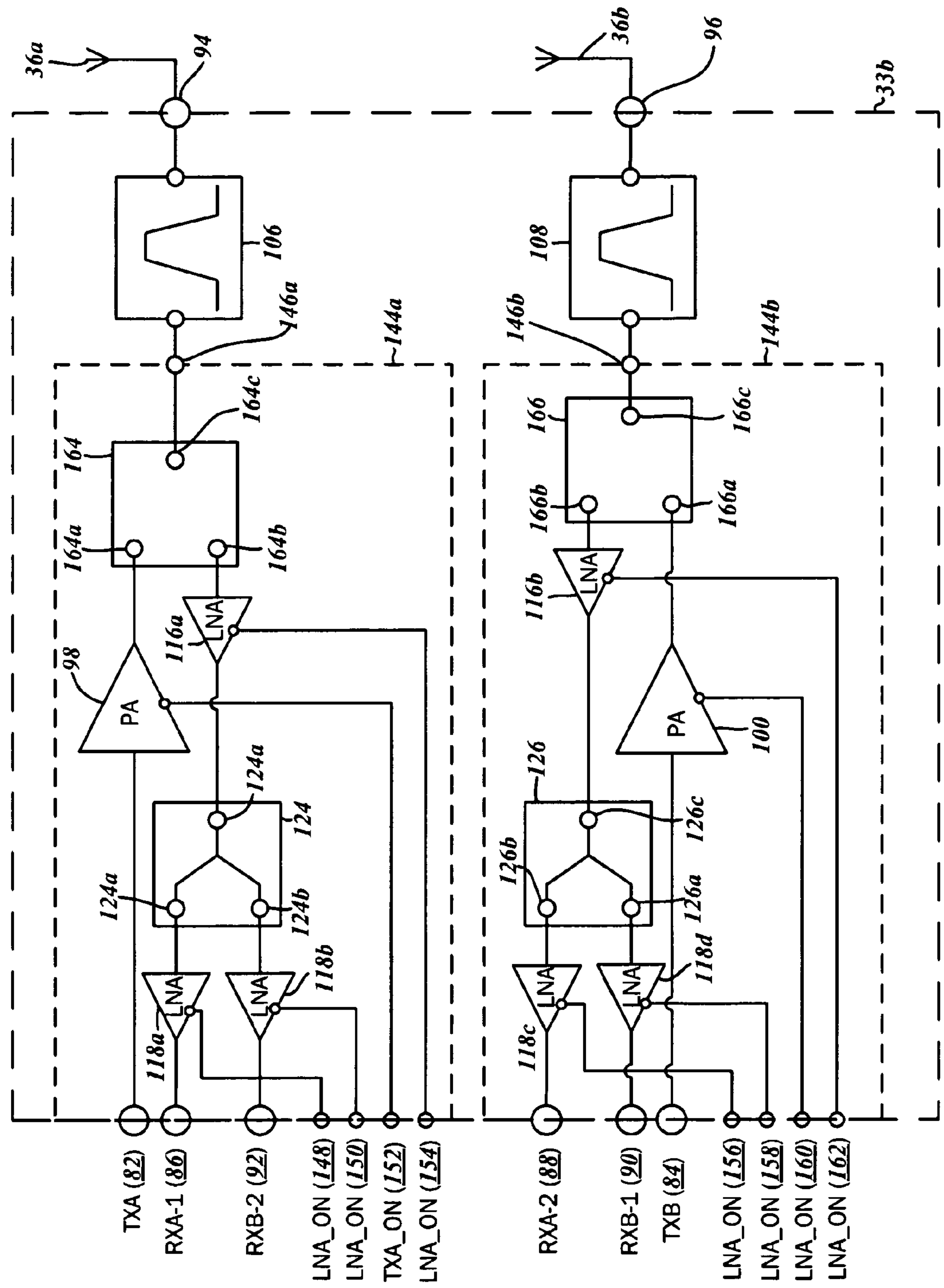
FIG. 13 is a schematic diagram of a third embodiment of the multi-channel RF transceiver front end circuit with full receive diversity comprised of a first module and a second module that each have a power splitter and an antenna switching/matching network.

The schematic diagram of FIG. 13 illustrates a specific implementation of the second embodiment of the front end module 33*b* shown in FIG. 9, and is comprised of two identical front end integrated circuits 144*a*, 144*b*. According to various embodiments, the integrated circuits may each be fabricated on a single die, or the entire front end module 33*b* may be fabricated on a single die.

Each integrated circuit 144 includes four transmit/receive ports as described above, including a transmit port, two receive ports, and an antenna port. In further detail, the first integrated circuit 144*a* includes the first transmit port 82, the first primary receive port 86, and the second secondary receive port 92. The first transmit port 82 is connected to the first power amplifier 98, while the first primary receive port 86 is connected to the second stage low noise amplifier 118*a* and the second secondary receive port 92 is connected to the second stage low noise amplifier 118*b*. The second integrated circuit 144*b* includes the second transmit port 84 connected to the second power amplifier 100. Moreover, the second integrated circuit 144*b* includes the first secondary receive port 88 connected to the second stage low noise amplifier 118*c*, as well as the second primary receive port 84 connected to the second stage low noise amplifier 118*d*.

Additionally, each integrated circuit 144 includes four control ports for the activation of the power amplifier, the two second stage low noise amplifiers, and the first stage low noise amplifier. The first integrated circuit 144*a* has a low noise amplifier control line 148 that enables the second stage low noise amplifier 118*a*, and another low noise amplifier control line 150 that enables the second stage low noise amplifier 118*b*. A power amplifier control line 152 enables the first power amplifier 98, and a low noise amplifier control line 154 enables the first stage low noise amplifier 116*a*. Similarly, the second integrated circuit 144*b* has a low noise amplifier control line 156 that enables the second stage low noise amplifier 118*c*, in addition to a low noise amplifier control line 158 that enables the second stage low noise amplifier 118*d*. There is also a power amplifier control line 160 that enables the second power amplifier 100, in addition to a low noise amplifier control line 162 that enables the first stage low noise amplifier 116*b*.

As explained more fully above, the second embodiment of the front end module 33*b* contemplates one transmit mode and three receive modes. In the first transmit mode, one or both of the power amplifier control lines 152, 160 are enabled, activating the power amplifiers 98, 100. In the first receive mode, the low noise amplifier control line 148 is enabled to activate the second stage low noise amplifier 118*a*, and the low noise amplifier control line 156 is enabled to activate the second stage low noise amplifier 118*c*. Additionally, the low noise amplifier control line 154 and the low noise amplifier control line 162 are enabled to activate both of the first stage low noise amplifiers 116*a-b*. In the second receive mode, the low noise amplifier control line 150 is enabled to activate the second stage low noise amplifier 118*b*, and the low noise amplifier control line 158 is enabled to activate the second stage low noise amplifier 118*d*. Again, the low noise amplifier control line 154 and the low noise amplifier control line 162 are both enabled to activate both of the first stage low noise amplifiers 116*a-b*. In the third receive mode, all of the low noise amplifier control lines 148, 150, 154, 156, 158, and 162 are activated for simultaneously reception.

The functionality of the various components of the front end integrated circuit 144 are understood to be identical to those described above in relation to the front end module 33*b*, including the second stage low noise amplifiers 118*a-d*, the power splitters 124, 126, the power amplifier 98, and the first stage low noise amplifiers 116*a-b*. Instead of the SPDT switches 120, 122 previously considered, however, a matching and switching networks 164, 166 may be substituted. The matching and switching networks 164, 166 include common terminals 164*c*, 166*c*, respectively, which are understood to correspond generally to the common terminals 120*c*, 122*c* of the SPDT switches. Further, the matching and switching networks 164, 166 also include first terminals 164*a*, 166*a* that correspond to the first terminals 120*a*, 122*a* of the SPDT switches, as well as second terminals 164*b*, 166*b* that correspond to the second terminals 120*b*, 122*b* of the SPDT switches. In this regard, it will be recognized that the SPDT switches 120, 122 are interchangeable with the matching and switching networks 164, 166, respectively.

One embodiment of the matching and switching circuits 164, 166 is disclosed in Applicant's co-pending patent application U.S. patent application Ser. No. 12/412,226 filed Mar. 26, 2009 entitled RADIO FREQUENCY TRANSCEIVER FRONT END CIRCUIT, which is expressly incorporated by reference in its entirety herein. Generally, the matching and switching circuits 164, 166 are configured to pass the signal from the antenna connection 146 to the power splitters 124, 126 when the first stage low noise amplifiers 116*a-b* are activated and the power amplifiers 98, 100 are deactivated. Additionally, the signal from the transmit ports 82, 84 are passed to the antenna connection 146 when the power amplifiers 98, 100 are activated and the first stage low noise amplifiers 116*a-b* are deactivated.

The antenna connections 146*a*, 146*b* are tied to the common terminals 164*c*, 166*c* of the respective one of the first and second front end integrated circuits 144*a*, 144*b*. It is contemplated that the first and second band pass filters 106, 108 are external to the front end integrated circuits 144*a*, 144*b*, and are connected to the signal chain from the antenna connections 146*a*, 146*b*. One port of the first band pass filter 106 is connected to the first antenna 36*a*, and one port of the second band pass filter 108 is connected to the second antenna 36*b*.

Figure 14:
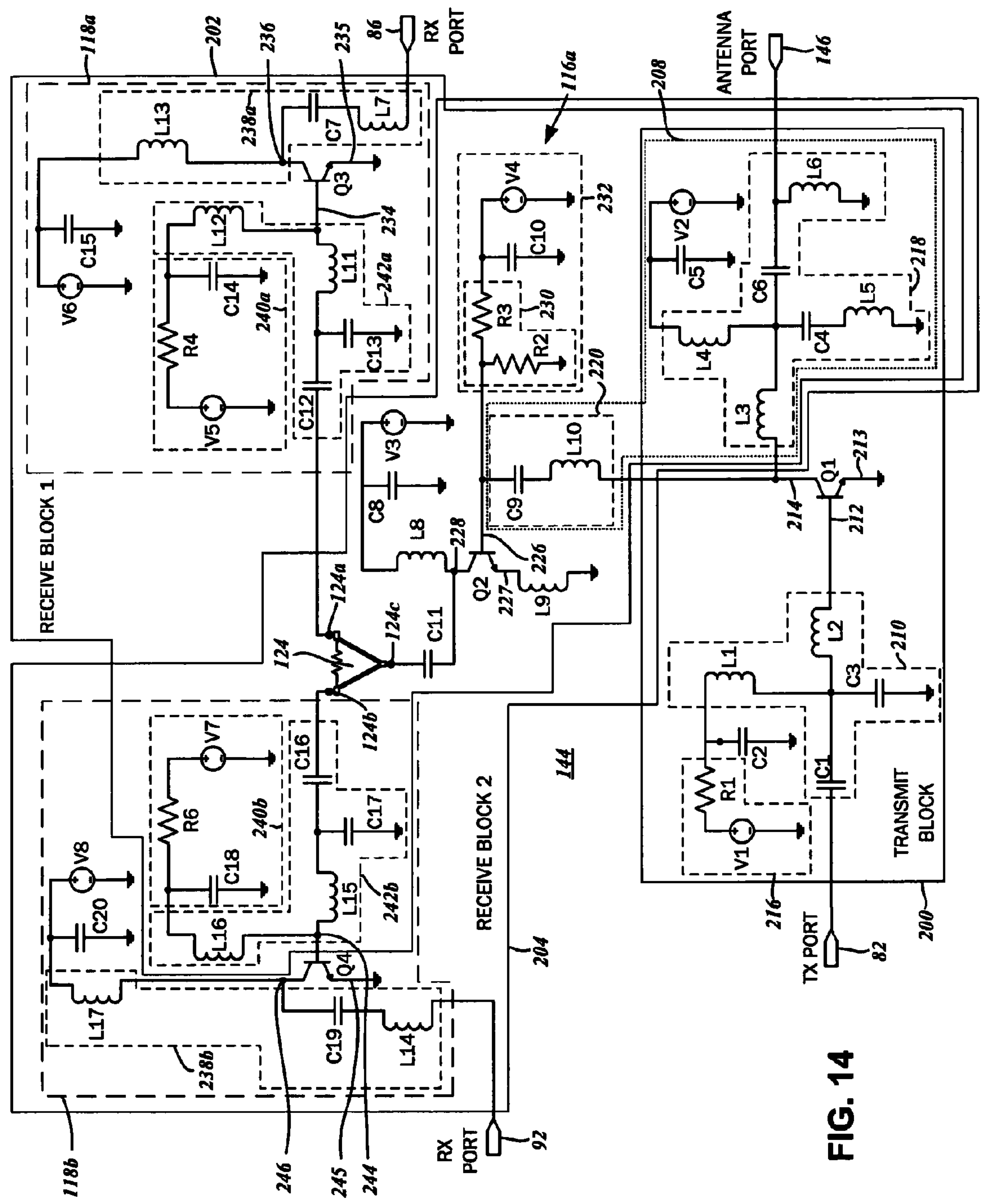
FIG. 14 is a detailed schematic diagram of one circuit that may be implement the first module and the second module of the multi-channel RF transceiver front end circuit in accordance with another embodiment of the present invention.

With reference to the schematic diagram of FIG. 14, further details regarding one implementation of the front end integrated circuit 144 will be described. Although the general components will be referenced in terms of the first front end integrated circuit 144*a*, it will be appreciated by those having ordinary skill in the art they are equally applicable to the second front end integrated circuit 144*b*. It is contemplated that the front end integrated circuit 144 represents a basic building block of the front end module 33.

The front end integrated circuit 144 is generally defined by a transmit block 200, a first receive block 202, and a second receive block 204. The various subparts thereof are understood to correspond to the aforementioned power amplifier 98, the first stage low noise amplifier 116*a*, the second stage low noise amplifiers 118*a*, 118*b*, and the matching and switching network 164, as will be detailed more fully below. The transmit block 200 includes the first transmit port 82, and the first receive block 202 includes the first primary receive port 86. Additionally, the second receive block 204 includes the second secondary receive port 92 The front end integrated circuit 144 also includes the first antenna connection 146 associated with each of the transmit block 200, the first receive block 202, and the second receive block 204. There is also an antenna matching block 208 that generally correspond to the matching and switching networks 164, and accordingly share various components of the transmit block 200, the first receive block 202, and the second receive block 204.

In further detail, the transmit block 200 has a single-stage power amplifier with a transistor Q1 in a common emitter configuration. It is understood that multi-stage amplifiers may also be utilized for higher gain applications, and those having ordinary skill in the art will recognize the appropriate modifications to the basic configuration presented herein for such multi-stage amplifiers. In some embodiments, it is contemplated that the transistor Q1 has a bipolar junction structure, though in some embodiments, they may have a field-effect structure (MOSFET, MESFET, and the like). In this regard, while the present disclosure variously references bases, collectors, and emitters of bipolar junction transistors, it is to be understood that such elements directly correspond to the gates, drains, and sources of field effect transistors.

The first power amplifier 98 includes circuitry for matching the input of the front end integrated circuit 144 to the 50-Ohm output impedance of the transceiver 28 at the operating frequency, as is common in most RF systems. The components of a power amplifier input matching network 210 include capacitors C1 and C3, as well as inductors L1 and L2, which match the first transmit port 82 to a base 212 of the transistor Q1 while it is being turned on and off in the operating frequency range. The capacitor C1 is tied to the first transmit port 82, the capacitor C3, and the inductors L1 and L2. The inductor L2 is tied to the base 212, and the capacitor C3 is tied to ground. The power amplifier input matching network 210 may be variously configured according to different gain, linearity, and wideband operation requirements.

Tied to the inductor L1 is an adjustable voltage source V1 that sets the bias point of the transistor Q1 of the first power amplifier 98 through a resistor R1. The bias conditions, in conjunction with the size or geometry of the transistor Q1, are chosen to maximize the operating power level at the antenna 36 during transmission. Additionally, an RF decoupling capacitor C2 having a sufficiently high capacitance is connected to the voltage source V1. These components are understood to comprise one embodiment of a transmit control circuit 216 that is coupled to the first power amplifier control line 152. A variable voltage may be generated intermittently by the transceiver 28 on the first power amplifier control line 152 and thus the transistor Q1, that is, the first power amplifier 98 is activated and deactivated. The transmit control circuit 216 is not intended to be limited to voltage supply circuits as considered above, and any other suitable supply such as a current mirror architecture may be readily substituted.

The transmit block 200, and specifically the collector 214 of the transistor Q1, is connected to the antenna matching block 208 that generally corresponds to the first matching and switch network 164. The antenna matching block 208 is defined by a power amplifier output matching segment 218 that includes inductors L3, L4, L5 and L6, as well as capacitors C4 and C6. The power amplifier output matching segment 218 impedance matches the transistor Q1 to the antenna 36 at the predefined operating frequency when active. The collector 214 of the transistor Q1 is connected to the inductor L3, which in turn is connected to capacitors C4, C6, and the inductor L4. The values of the capacitor C4 and the inductor L5 connected in series thereto and to ground are selected to provide a series resonance at the second harmonic of the predefined operating frequency. A voltage source V2 is connected to the inductor L4, and provides biasing to the collector 214 of the transistor Q1. It is contemplated that the voltage source V2 is provided by battery or other appropriate device independent of the other control lines referenced herein. Similar to the voltage source V1, an RF decoupling capacitor C5 is connected between the voltage source V2 and ground.

In accordance with various embodiments, the inductor L6 has an electrostatic discharge function. The resistive component of the inductor L6 is contemplated to have a value less than 5 Ohm to provide a direct current (DC) pass from the antenna connection 146 to ground in case a high voltage is accidentally applied. Accordingly, the need for electronic discharge clamp circuitry that degrades signal transmission performance, as is typical in silicon substrate-based semiconductor devices, is eliminated.

The power amplifier output matching segment 218 is configured in a way that the resistive part of the impedance at the collector 214 of the transistor Q1 is equal or below the resistive component of an output impedance or transistor load impedance required for the activated transistor Q1 that corresponds to a predetermined 1 dB compression point (P1 dB) at a specific bias voltage. In this regard, the power amplifier output matching segment 218 is loaded at the antenna side by a predefined load (typically 50 Ohms) while the first receive block 202, including a first stage low noise amplifier input matching segment 220, is disconnected.

The first stage low noise amplifier input matching segment 220 is comprised of a capacitor C9 and an inductor L10 that are exclusive thereto. The first stage low noise amplifier input matching segment 220 is combined with the inductors L3, L4, L5 and L6 and capacitors C4 and C6, which are shared with the power amplifier output matching segment 218, to impedance match the first stage low noise amplifier 116*a* to the antenna 36 while active. The capacitor C9 and the inductor L10 are connected in series to the collector 214 of the transistor Q1 and a base 226 of a shared low noise amplifier transistor Q2.

A number of factors are applicable to the optimal configuration of the first stage low noise amplifier input matching segment 220. In particular, the size or geometry of the shared low noise amplifier transistor Q2 is selected such that the resistive component of an input impedance of an activated shared low noise amplifier transistor Q2 is substantially similar to the resistive component of an output impedance required for the activated transistor Q1 of the power amplifier 98. The values of the capacitor C9 and the inductor L10 are selected to reach a minimal noise figure (NF) between the antenna 36 and the output of the first stage low noise amplifier 116*a*, as well as a minimal input return loss for an activated shared low noise amplifier transistor Q2 and a deactivated transistor Q1 of the power amplifier 98. A suitable NF, according to one embodiment, may be less than 3 dB. The input return loss is understood to be measured from the antenna 36, and includes the receive chain of the antenna matching block 208, i.e., the shared power amplifier output matching segment 218 and the low noise amplifier input matching segment 220. One embodiment contemplates an input return loss of less than −10 dB.

The capacitor C9 and the inductor L10 are selected to correspond to a substantially minimized voltage swing at the base 226 of the transistor Q2. When the first power amplifier 98 is on, an optimized configuration minimizes the voltage being applied to the first stage low noise amplifier 116*a* to prevent the transistor Q2 from conducting while the base-emitter resistance decreases, thereby degrading the transmitted RF signal.

Generally, the smallest value of the capacitor C9 is understood to result in the minimum voltage amplitude at the base-emitter junction of the transistor Q2 when the transistor Q1 is on and the transistor Q2 is off, thus increasing its reliability. Additionally, linearity of the power amplifier 98 is achieved at higher transmit power levels. Avoiding a resonance frequency of the low noise amplifier input matching segment 220 close to the predefined operating frequency also decreases voltage swing at the base-emitter junction of the deactivated transistor Q2, so in one exemplary configuration, the resonance frequency is set to be at least a few hundred MHz higher.

As indicated above, the antenna matching block 208 is connected to the first receive block 202, which includes the first stage low noise amplifier 116*a* and other associated circuitry. The first receive block 202 and the second receive block 204 together define the first stage low noise amplifier first 116*a*. The transistor Q2 is associated with the first stage low noise amplifier 116*a*, and is also in a common-emitter configuration. Additionally connected to the emitter 227 of the shared low noise amplifier transistor Q2 is an optional degeneration inductor L9 that is tied to ground. In some cases, the base-emitter impedance of the shared low noise amplifier transistor Q2 may be better matched to the antenna 36.

An adjustable voltage source V4 is also connected to the base 226 of the shared low noise amplifier transistor Q2 for activating and setting its bias point. As previously noted, a variable voltage may be generated intermittently by the transceiver 28 on the low noise amplifier control line 154 and so the first stage low noise amplifier 116*a* is activated and deactivated thereby. The voltage is provided through a resistive divider 230 that includes a resistor R3 connected to the adjustable voltage source V4 and a resistor R2 connected to ground and the resistor R3. The junction between the resistor R2 and the resistor R3 is tied to the base 226 of the shared low noise amplifier transistor Q2. The resistive divider 230 is configured to have a sufficient resistance to prevent shunting of the impedance at the base 226 of the transistor Q2, that is, the base-emitter resistance of the activated shared low noise amplifier transistor Q2 is less than that of the resistive divider 230. An RF decoupling capacitor C10 is also connected to the voltage source V4. These components are understood to comprise one embodiment of a first stage receive control circuit 232. As with the transmit control circuit 216, the first stage receive control circuit 232 is not intended to be limited to a voltage supply as above, and other configurations such as a current mirror are also suitable. A voltage source V3 biases the collector 228 of the shared low noise amplifier transistor Q2, and there is included an RF decoupling capacitor C8. The collector 228 is coupled to the inductor L8 and a capacitor C11, which are understood to be an inter-stage matching circuit.

The first stage low noise amplifier 116*a* is connected to the second low noise amplifier stage 118*a* and a second low noise amplifier stage 118*b* over the power divider 124. In further detail, the power divider 124 includes the common port 124*c* connected to the first stage low noise amplifier 116*a*, specifically, through the capacitor C11. Additionally, the power divider 124 includes the first split port 124*a* and the second split port 124*b*. The values of the inductor L8 and the capacitor C11 are selected such that there is a substantially resistive impedance in the predefined operating frequency at the common port 124*c*. Furthermore, the resistive impedance at the common port 124*c* is selected to minimize the resistive part of the impedance at the collector 228 of the shared low noise amplifier transistor Q2, thereby increasing 1 dB gain compression to sustain large blocking RF signals.

The second stage low noise amplifier stage 118*a* includes the transistor Q3 that is in a common-emitter configuration. The collector 236 is tied to a bias voltage source V6 through an inductor L13, which is part of a second stage low noise amplifier output matching circuit 238*a* in combination with the capacitor C7 and the inductor L7. The second stage low noise amplifier output matching circuit 238*a* is connected to the first primary receive port 86 and impedance matches the transistor Q3 thereto. Additionally, the RF decoupling capacitor C15 is tied to the voltage source V6. A first receive control circuit 240*a* includes the adjustable voltage source V5 that is connected to the low noise amplifier control line 118*a* to provide a suitable voltage to settle the bias point of the transistor Q3. The second stage receive control circuit 240*a* is comprised of the resistor R4 and the inductor L12, as well as the RF decoupling capacitor C14.

The second stage low noise amplifier 118*a* is further comprised of an input matching circuit 242*a* that is connected to the first split port 124*a* of the power divider 124. More particularly, the matching circuit 242*a* is comprised of capacitors C12 and C13, and inductors L11 and L12 to match the impedance at the first split port 124*a* and the impedance of the base-emitter junction of the transistor Q3 when activated. As indicated above, a high isolation between the first split port 124*a* and the second split port 124*b* is understood to minimize the influence of the transistor Q4.

The second stage low noise amplifier 118*b* is based on the transistor Q4, also in a common-emitter configuration. The collector 246 of the transistor Q4 is tied to a bias voltage source V8 through the inductor L17, and together with the capacitor C19 and the inductor L14, define the second stage low noise amplifier output matching circuit 238*b* that is connected to the second secondary receive port 92. The bias voltage source V8 is also connected to the RF decoupling capacitor C20. A second stage receive control circuit 240*b* includes the adjustable voltage source V7 that is connected to low noise amplifier control line 150 to settle the bias point of the transistor Q4. The second stage receive control circuit 240*b* also includes the RF decoupling capacitor C18.

The second stage low noise amplifier 118*b* is further comprised of an input matching circuit 242*b* connected to the second split port 124*b* of the power divider 124. The matching circuit 242*b* is comprised of capacitors C16, C17 and inductors L15 and L16 to match the impedance at the second split port 124*b* and the impedance of the base-emitter junction of the transistor Q4 when activated. Again, the high isolation between the second split port 124*b* and the first split port 124*a* is understood to minimize the influence of the transistor Q3.

The various operational states of the front end integrated circuit 144 will now be considered in light of the foregoing features, particularly in relation to the transmit modes and the receive modes of the front end module 33. In the transmit mode, the transistor Q1 is activated with an appropriate enable signal being applied to the transmit control circuit 216 from the power amplifier control line 152. The transistors Q2, Q3, and Q4 are off. The signal at the transmit port 82 is amplified by the transistor Q1 and transmitted via the antenna 36.

In the first receive mode, the first stage low noise amplifier transistor Q2 and the transistor Q3 are activated, with an appropriate voltage applied to the first stage receive control circuit 232 and the second stage receive control circuit 240*a*. The transistors Q1, and Q4 are off, and the signal received by the antenna 36 is amplified by the first stage low noise amplifier 116*a* (transistors Q2) and the second stage low noise amplifier 118*a* (transistor Q3) and passed to the first primary receive port 86.

In the second receive mode, again, the first stage low noise amplifier transistor Q2 is activated, with an appropriate voltage being applied to the first stage receive control circuit 232 through the low noise amplifier control line 154. Furthermore, the second stage low noise amplifier transistor Q4 is activated by a voltage applied to the second stage control circuit 240*b* by the low noise amplifier control line 150. The transistors Q1 and Q3 are off, and the signal received by the antenna 36 is amplified by the first stage low noise amplifier 116*a* (transistor Q2) and the second stage low noise amplifier 118*b* (transistor Q4).

In the third receive mode, the first stage low noise amplifier transistor Q2 is activated with the appropriate voltage applied to the first stage receive control circuit 232 through the low noise amplifier control line 154. The second stage low noise amplifier transistors Q3 and Q4 are both activated by voltages applied to the second stage control circuits 240*a*, 240*b* by the low noise amplifier control lines 148, 150, respectively. The transistor Q1 is off, and the signal received by the antenna 36 is amplified by the first stage low noise amplifier 116*a* (transistor Q2), the second stage low noise amplifier 118*a* (transistor Q3) and the second stage low noise amplifier 118*b* (transistor Q4).

Figure 15:
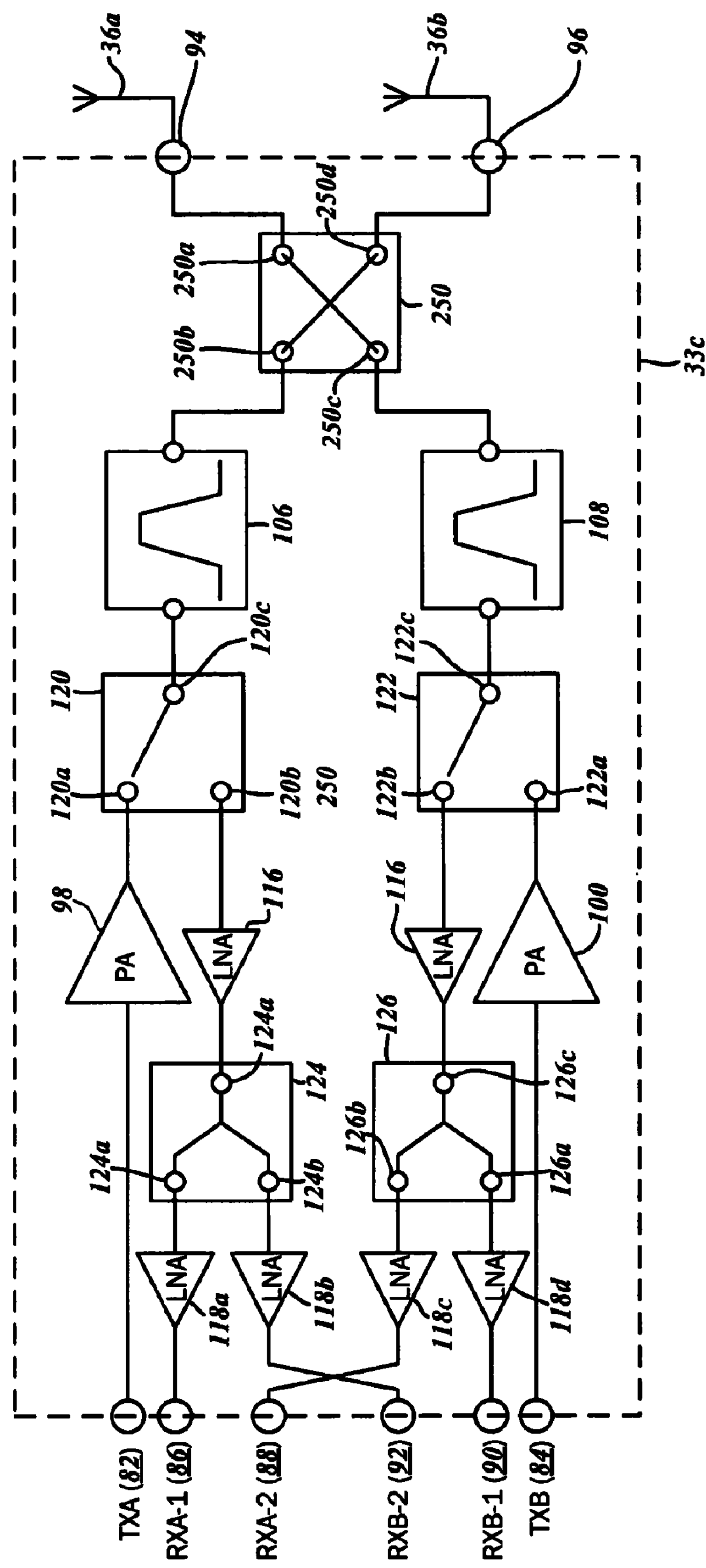
FIG. 15 is a schematic diagram of a fourth embodiment of the multi-channel RF transceiver front end circuit including a double pole, double throw switch to select between the first antenna and the second antenna.

With reference to FIG. 15, a third embodiment of the front end module 33*c* contemplates the addition of a dual pole, dual throw (DPDT) switch for full transmit and receive diversity. As in the second embodiment 33*b* considered above, the front end module 33*c* includes the antenna port 94 that is connectible to the first antenna 36*a* and the second antenna port 96 connectible to the second antenna 36*b*. Furthermore, the front end module 33*c* includes the first transmit port 82 that is tied to the transmit line of the first channel module 30*a*, and the second transmit port 84 that is tied to the transmit line of the second channel module 30*b*. Additionally, there is the first primary receive port 86 and the first secondary receive port 88 that are tied to the primary receive line and the secondary receive line, respectively, of the first channel module 30*a*. The front end module 33*b* also includes the second primary receive port 90 and the second secondary receive port 92 tied to the primary receive line and the secondary receive line, respectively, of the second channel module 30*b*.

The third embodiment of the front end module 33*c* includes many of the same components as the second embodiment 33*b*. Amongst the shared components include the first power amplifier 98, the second power amplifier 100, the first band pass filter 106, the second band pass filter 108, the first stage low noise amplifiers 116*a-b*, the second stage low noise amplifiers 118*a-d*, the first SPDT switch 120, the second SPDT switch 122, the first power splitter 124, and the second power splitter 126. Thus, the functionality of such components both individually and in relation to one another is understood to be the same. One additional component included in the third embodiment 33*c* is, as mentioned above, the DPDT switch 250, and further details will be described.

The DPDT switch 250 has a first port 250*a* connected to the first antenna port 94, a second port 250*b* connected to the first band pass filter 106, a third port 250*c* connected to the second band pass filter 108, and a fourth port 250*d* connected to the second antenna port 96. It is contemplated that the isolation between any one of the ports of the DPDT switch 250 is maximized, and is at least greater than 20 dB.

In operation, the DPDT switch 250 has a first state in which the first port 250*a* is connected to the second port 250*b*, and the fourth port 250*d* is connected to the third port 250*c*. There is also a second state in which the first port 250*a* is connected to the third port 250*c*, and the fourth port 250*d* is connected to the second port 250*b*. Thus, the first transmit port 82 and the second transmit port 84 can be selectively connected to either of the first or second antennas 36*a*, 36*b*. It will be appreciated that this is suitable for situations where one of the antennas 36 suffers from multi-path phenomena or is shadowed by obstacles in the transmit mode. Receive antenna diversity is understood to continue to function as described above.

Figure 16:
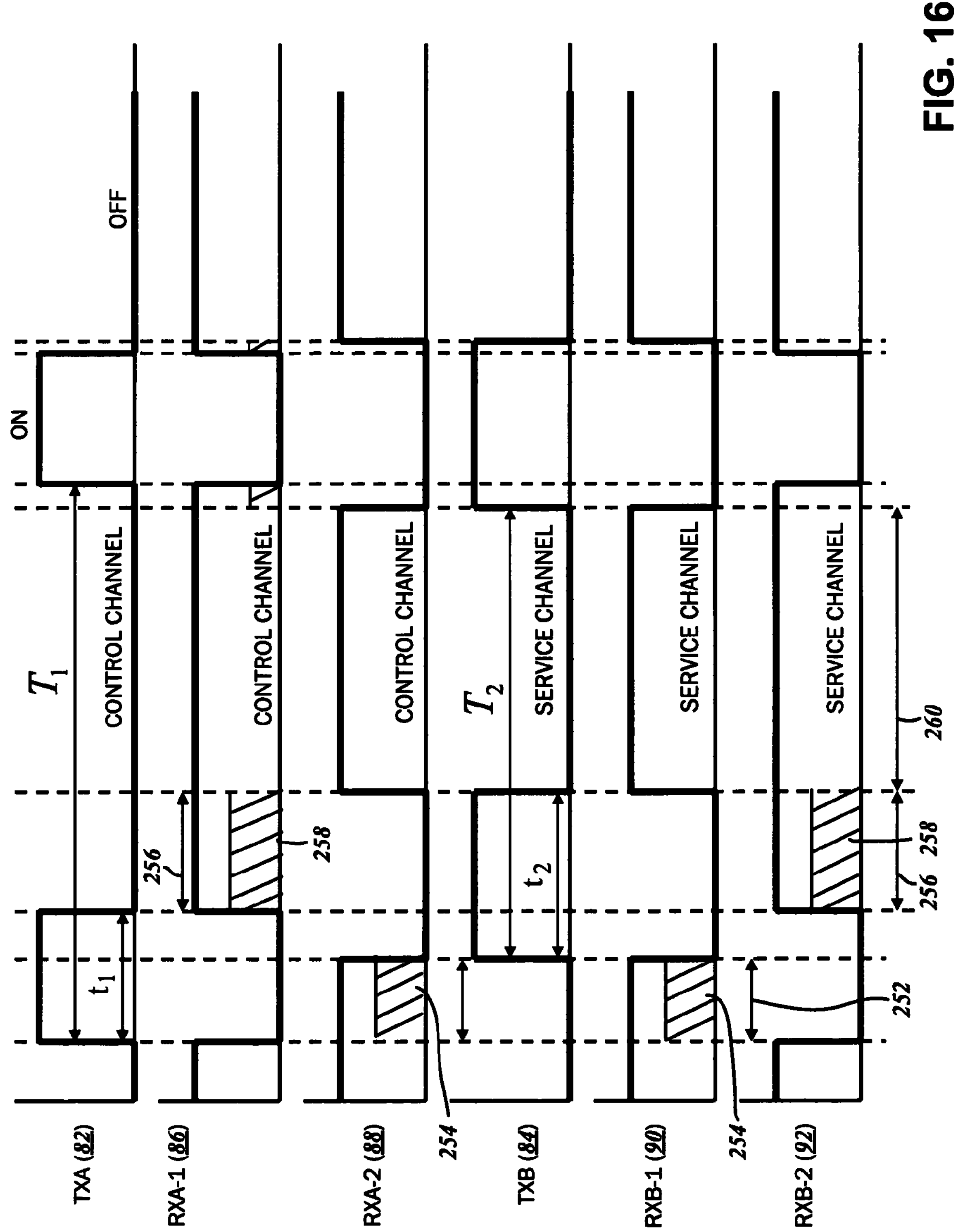
FIG. 16 is an exemplary timing diagram showing one operational sequence of the fourth embodiment of the multi-channel RF transceiver front end circuit shown in FIG. 13.

FIG. 16 shows an operational sequence of the third embodiment of the front end module 33*c*. It is contemplated that the activation of the first primary receive port 86 is exclusive of the activation of the first transmit port 82 during time period t1. However, since the activation of the first secondary receive port 88 is independent of the first transmit port 82, the two can be activated simultaneously. The activation of the second primary receive port 90 is exclusive of the activation of the second transmit port 84 during the time period t2. The activation of the second secondary receive port 92 is also independent of the second transmit port 84, and the two can likewise be activated simultaneously.

During a time period 252 in which the first transmit port 82 is activated and the second transmit port 84 is not activated, the first secondary receive port 88 and the second primary receive port 90 have a period of reduced sensitivity 254, as there is no antenna diversity. Additionally, the period of reduced sensitivity 254 may be the result of leakage of the transmitted signal. Along these lines, during a time period 256 when the second transmit port 84 is activated but the first transmit port 82 is not, the first primary receive port 86 and the second secondary receive port 92 also have a period of reduced sensitivity 258. In either of the periods of reduced sensitivity 254, 258, receiver training purposes such as original gain setting, phase lock loop (PLL) frequency setting and so forth may be completed.

When neither the first transmit port 82 nor the second transmit port 84 are active as in time period 260, all of the receive ports, that is, the first primary receive port 86, the first secondary receive port 88, the first secondary receive port 90, and the second secondary receive port 92, may be simultaneously activated. Accordingly, full antenna diversity for both the control channel and the service channel is possible.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding of the present invention, the description taken with the drawings making apparent to those skilled in the art how the several forms of the present invention may be embodied in practice.

What is claimed is:

1. An RF front end circuit for coupling antennas to a transceiver having a first operational channel and a second operational channel, each of the first and second operational channels including a transmit line, a first receive line and a second receive line, the front end circuit comprising: a first antenna chain and a second antenna chain each having: a transmit mode connecting the transmit line to a one of the antennas; a first receive mode connecting a one of the receive lines of one of the operational channels to the one of the antennas; a second receive mode connecting a one of the receive lines of a different one of the operational channels to the one of the antennas; and a third receive mode connecting the one of the receive lines of the one of the operational channels and the one of the receive lines of the different one of the operational channels to the one of the antennas; wherein the transmit mode of each antenna chain is exclusive of the receive modes of the corresponding antenna chain.

2. The front end circuit of claim 1, wherein the transmit mode of the first antenna chain is independent of the transmit mode of the second antenna chain.

3. The front end circuit of claim 1, wherein the receive modes of the first antenna chain are independent of the receive modes of the second antenna chain.

4. The front end circuit of claim 3, wherein a combination of the first receive mode in the first antenna chain and the second receive mode in the second antenna chain provides full receive diversity for the first operational channel.

5. The front end circuit of claim 3, wherein a combination of the second receive mode in the first antenna chain and the first receive mode in the second antenna chain provides full receive diversity for the second operational channel.

6. The front end circuit of claim 1, wherein the transmit mode of the second antenna chain is active exclusively during the transmit mode of the first antenna chain.

7. The front end circuit of claim 1, wherein the first receive mode of the first antenna chain and the second receive mode of the second antenna chain are exclusive of the transmit modes of the first and second antenna chains.

8. The front end circuit of claim 7, wherein the transmit mode of the first antenna chain is followed by the first receive mode of the first antenna chain and the second receive mode of the second antenna chain.

* * * * *